United States Patent
Koul et al.

(10) Patent No.: US 11,985,270 B2
(45) Date of Patent: May 14, 2024

(54) SYSTEM AND METHODS FOR ADAPTIVE CAMPAIGN MANAGEMENT AND PREDICTIVE CUSTOMER ENGAGEMENT UTILIZING A CUSTOMER DATA PLATFORM

(71) Applicant: Acqueon Technologies Inc., Dallas, TX (US)

(72) Inventors: Ashish Koul, San Jose, CA (US); Ashok Raj Susairaju, Chennai (IN)

(73) Assignee: ACQUEON TECHNOLOGIES INC., Dallas, TX (US)

( * ) Notice: Subject to any disclaimer, the term of this patent is extended or adjusted under 35 U.S.C. 154(b) by 22 days.

(21) Appl. No.: 18/179,355

(22) Filed: Mar. 6, 2023

(65) Prior Publication Data

US 2023/0199117 A1  Jun. 22, 2023

Related U.S. Application Data

(63) Continuation of application No. 17/973,339, filed on Oct. 25, 2022, which is a continuation-in-part of (Continued)

(51) Int. Cl.
*H04M 3/51* (2006.01)
*G06Q 10/0631* (2023.01)

(52) U.S. Cl.
CPC .... *H04M 3/5158* (2013.01); *G06Q 10/06311* (2013.01); *H04M 3/5183* (2013.01)

(58) Field of Classification Search
CPC .......................... H04M 3/5158; G06Q 30/0201
See application file for complete search history.

(56) References Cited

U.S. PATENT DOCUMENTS

| 8,417,715 B1 * | 4/2013 | Bruckhaus | G06Q 10/04 705/26.1 |
| 8,712,828 B2 * | 4/2014 | Maga | G06Q 30/02 705/7.31 |

(Continued)

OTHER PUBLICATIONS

Ullah et al, A Churn Prediction Model Using Random Forest: Analysis of Machine Learning Techniques for Churn Prediction and Factor Identification in Telecom Sector, IEEE Access, vol. 7, pp. 60134-60149 (Year: 2019).*

(Continued)

*Primary Examiner* — Andre D Boyce
(74) *Attorney, Agent, or Firm* — Galvin Patent Law LLC; Brian R. Galvin

(57) ABSTRACT

A system and method that provides adaptive campaign management and customer engagement predictions utilizing a customer data platform comprising an data ingestion module, an analytics module, and a unified customer database. Furthermore, the system and method ingest a plurality of disparate information related to a customer from various information sources such as enterprise specific customer records, social media data and metadata, web app data and metadata, and mobile device app data and metadata, transforms the ingested data into a standard data format, and correlates the transformed data with existing customer information to form a unified customer profile. The system uses machine learning for predictions and maintenance of customer profiles, and continuously and automatically updates the machine learning models over time. A collection of unified customer data profiles may represent a unified knowledge base of customer information that can be accessed by a plurality of enterprises for call campaign management.

16 Claims, 12 Drawing Sheets

Related U.S. Application Data application No. 17/571,526, filed on Jan. 9, 2022, now Pat. No. 11,483,429, which is a continuation of application No. 17/348,545, filed on Jun. 15, 2021, now Pat. No. 11,223,722, application No. 18/179,355 is a continuation-in-part of application No. 17/385,965, filed on Jul. 27, 2021.

(60) Provisional application No. 63/130,014, filed on Dec. 23, 2020.

(56) References Cited

U.S. PATENT DOCUMENTS

| | | | | |
|---|---|---|---|---|
| 9,922,649 | B1* | 3/2018 | LoRe | G06Q 30/016 |
| 2015/0371163 | A1* | 12/2015 | Noh | G06Q 10/0635 |
| | | | | 705/7.28 |
| 2016/0253688 | A1* | 9/2016 | Nielsen | G06Q 50/01 |
| | | | | 705/7.31 |
| 2016/0342911 | A1* | 11/2016 | Kannan | G06Q 10/0631 |
| 2018/0285772 | A1* | 10/2018 | Gopalan | G06N 7/01 |
| 2018/0349986 | A1* | 12/2018 | Fidanza | G06Q 40/02 |
| 2019/0057408 | A1* | 2/2019 | Flora | G06N 20/00 |
| 2019/0370833 | A1 | 12/2019 | Gold et al. | |
| 2020/0151746 | A1* | 5/2020 | Wu | G06F 17/16 |
| 2021/0012260 | A1 | 1/2021 | Zhang et al. | |
| 2021/0241292 | A1* | 8/2021 | Pandey | G06N 3/044 |
| 2021/0350395 | A1* | 11/2021 | Avinash Dorle | G06Q 30/0631 |
| 2021/0365863 | A1* | 11/2021 | Friske | G06Q 30/0202 |
| 2021/0365965 | A1* | 11/2021 | Shrivastava | G06N 3/088 |
| 2021/0406743 | A1* | 12/2021 | Liu | G06N 7/01 |
| 2022/0012763 | A1* | 1/2022 | Sharma | G06N 3/048 |
| 2022/0164593 | A1* | 5/2022 | Singla | H04L 47/823 |
| 2023/0140020 | A1* | 5/2023 | Parameswar | G06Q 30/0271 |
| | | | | 705/14.53 |

OTHER PUBLICATIONS

Rygielski et al, Data mining techniques for customer relationship management, Technology in Society 24 (2002) pp. 483-502 (Year: 2002).*

Deligiannis et al, Designing a Real-Time Data-Driven Customer Churn Risk Indicator for Subscription Commerce, I.J. Information Engineering and Electronic Business, 2020, 4, 1-14 (Year: 2020).*

Chan, Intelligent value-based customer segmentation method for campaign management: A case study of automobile retailer, Expert Systems with Applications 34 (2008) pp. 2754-2762 (Year: 2008).*

* cited by examiner

SYSTEM AND METHODS FOR ADAPTIVE CAMPAIGN MANAGEMENT AND PREDICTIVE CUSTOMER ENGAGEMENT UTILIZING A CUSTOMER DATA PLATFORM

CROSS-REFERENCE TO RELATED APPLICATIONS

Priority is claimed in the application data sheet to the following patents or patent applications, each of which is expressly incorporated herein by reference in its entirety:
Ser. No. 17/385,965
Ser. No. 17/973,339
Ser. No. 17/571,526
Ser. No. 17/348,545
63/130,014

BACKGROUND OF THE INVENTION

Field of the Art

The disclosure relates to the field of machine learning, and more particularly to the field of predictions and optimizations.

Discussion of the State of the Art

Core challenges faced by businesses have not changed since the first businesses were instated at least five millenniums ago. Problems arising from customer service and customer retention, to ensuring customers make timely payments, still haunt all businesses in the 21st century. However, most modern-day businesses still operate with $20t^h$ century technology.

Regarding the customer service aspect, it is the primary intent for any customer service department to maximize the resources of its contact center. In today's world, it is more challenging than ever to contact customers, whether selling a new product or collecting past due payments; hence, automated dialers came into existence and since then have become an integral part of most outbound collection, telemarketing, and outbound customer service strategies. However, these devices working alone can neither determine when to contact which customers nor identify the best communication mode to use.

Additionally, customer retention is an increasingly pressing issue in today's ever-competitive commercial arena. Companies are eager to develop a customer retention focus and create initiatives to maximize long-term customer value. Specifically, customer churn risk is at the forefront of customer retention focus. However, current day retention strategy best-practices are still problematic, often leading to inconsistent results. Furthermore, collection is another age-old problem among businesses and still accounts for a significant amount of lost capital. Call center administrators want to maximize their agent resources by making sure that they are calling customers who are willing to pay their bills. There is currently no system that can accurately predict a range of customer's propensities to pay, answer, and stay within a company and further optimize existing technologies around those predictions.

What is needed is a system and method that uses machine learning to make predictions about customer's propensity to engage with an enterprise to achieve a business outcome and subsequently use those predictions to reconfigure business technologies.

SUMMARY OF THE INVENTION

Accordingly, the inventor has conceived and reduced to practice, a system and method that provides adaptive campaign management and customer engagement predictions utilizing a customer data platform comprising an data ingestion module, an analytics module, and a unified customer database. Furthermore, the system and method ingest a plurality of disparate information related to a customer from various information sources such as enterprise specific customer records, social media data and metadata, web app data and metadata, and mobile device app data and metadata, transforms the ingested data into a standard data format, and correlates the transformed data with existing customer information to form a unified customer profile. The system uses machine learning for predictions and maintenance of customer profiles, and continuously and automatically updates the machine learning models over time. A collection of unified customer data profiles may represent a unified knowledge base of customer information that can be accessed by a plurality of enterprises for call campaign management.

According to a first preferred embodiment, a system for adaptive campaign management utilizing a customer data platform is disclosed, comprising: a data ingestion module comprising at least a first plurality of programming instructions stored in a memory of, and operating on at least one processor of, a computing device, wherein the first plurality of programming instructions, when operating on the at least one processor, causes the computing device to: ingest a plurality of information related to a customer from one or more sources; transform the plurality of information into a standard data format; correlate the transformed information with an existing customer data profile stored in a database and update the existing customer data profile with the transformed information, wherein if there is no existing customer data profile stored in the database a new customer profile is created and populated with the transformed information; and store the updated customer profile in the database as a unified customer profile; and an analytics module comprising at least a second plurality of programming instructions stored in a memory of, and operating on at least one processor of, a computing device, wherein the second plurality of programming instructions, when operating on the at least one processor, causes the computing device to: retrieve a subset of customer data profiles from the database; segregate the subset of customer data profiles into a training dataset and a test dataset; use the training dataset to train a deep reinforcement learning neural network configured to predict a probability of customer engagement; retrieve the unified customer data profile from the database; receive a predicted propensity to churn associated with the customer associated with the retrieved unified customer data profile; receive a predicted probability to pay a bill associated with the customer associated with the retrieved unified customer data profile; receive a most probable block of time of each day that the customer associated with the retrieved unified customer data profile will engage in communication; receive a predicted most probable means of communication for each block of time for the customer associated with the retrieved unified customer data profile; and feed the retrieved unified customer data profile, the predicted propensity to churn, the predicted probability to pay, the most probable time of each day, and the predicted most probable means of communication as input into the trained deep reinforcement learning neural network to generate a predicted probability of engagement for the customer associated with the retrieved unified customer data profile.

According to a second preferred embodiment, a method for adaptive campaign management utilizing a customer data platform is disclosed, comprising the steps of: ingesting a plurality of information related to a customer from one or more sources; transforming the plurality of information into a standard data format; correlating the transformed information with an existing customer data profile stored in a database and update the existing customer data profile with the transformed information, wherein if there is no existing customer data profile stored in the database a new customer profile is created and populated with the transformed information; storing the updated customer profile in the database as a unified customer profile; retrieving a subset of customer data profiles from the database; segregating the subset of customer data profiles into a training dataset and a test dataset; using the training dataset to train a deep reinforcement learning neural network configured to predict a probability of customer engagement; retrieving the unified customer data profile from the database; receiving a predicted propensity to churn associated with the customer associated with the retrieved unified customer data profile; receiving a predicted probability to pay a bill associated with the customer associated with the retrieved unified customer data profile; receiving a most probable block of time of each day that the customer associated with the retrieved unified customer data profile will engage in communication; receiving a predicted most probable means of communication for each block of time for the customer associated with the retrieved unified customer data profile; and feeding the retrieved unified customer data profile, the predicted propensity to churn, the predicted probability to pay, the most probable time of each day, and the predicted most probable means of communication as input into the trained deep reinforcement learning neural network to generate a predicted probability of engagement for the customer associated with the retrieved unified customer data profile.

According to an aspect of an embodiment, a propensity prediction and optimization platform comprising at least a third plurality of programming instructions stored in the memory of, and operating on at least one processor of, the computing device, wherein the third plurality of programming instructions, when operating on the at least one processor, causes the computing device to: receive a plurality of customer records; use one or more machine learning modules on the plurality of customer records to: predict the most probable block of time of each day each customer in the plurality of customer records will engage in communication; predict the most probable means of communication for each block of time for each customer in the plurality of customer records; predict the propensity to churn for each customer in the plurality of customer records; and predict the probability of each customer in the plurality of customer records to pay a bill; send the predictions to the analytics module, the predictions comprising the predicted propensity to churn, the predicted probability to pay, the most probable time of each day, and the predicted most probable means of communication.

According to an aspect of an embodiment, the one or more sources comprises enterprise-specific customer records, social media, web applications, and mobile device applications.

According to an aspect of an embodiment, the standard data format is a JSON format.

According to an aspect of an embodiment, the database comprises at least a relational database.

According to an aspect of an embodiment, the database further comprises a non-relational database.

According to an aspect of an embodiment, a centralized campaign manager comprising at least a fourth plurality of programming instructions stored in the memory of, and operating on at least one processor of, the computing device, wherein the fourth plurality of programming instructions, when operating on the at least one processor, causes the computing device to: obtain a unified customer record from the database, wherein the unified customer record indicates the customer has not provided consent to receive a telephone call; establish a connection with the customer via one or more digital channels of communication; obtain customer consent via the one or more digital channels; and update the consent status in the unified customer record and store the updated unified customer record in the database.

According to an aspect of an embodiment, the predicted propensity to churn, the predicted probability to pay, the most probable time of each day, and the predicted most probable means of communication are all based at least in part on real-time status data According to an aspect of an embodiment, the analytics module is further configured to receive a predicted effectiveness of sending a reminder to the customer associated with the retrieved unified customer data profile at a specific time relative to another specific time.

BRIEF DESCRIPTION OF THE DRAWING FIGURES

The accompanying drawings illustrate several aspects and, together with the description, serve to explain the principles of the invention according to the aspects. It will be appreciated by one skilled in the art that the particular arrangements illustrated in the drawings are merely exemplary, and are not to be considered as limiting of the scope of the invention or the claims herein in any way.

DETAILED DESCRIPTION OF THE DRAWING FIGURES

Figure 1:
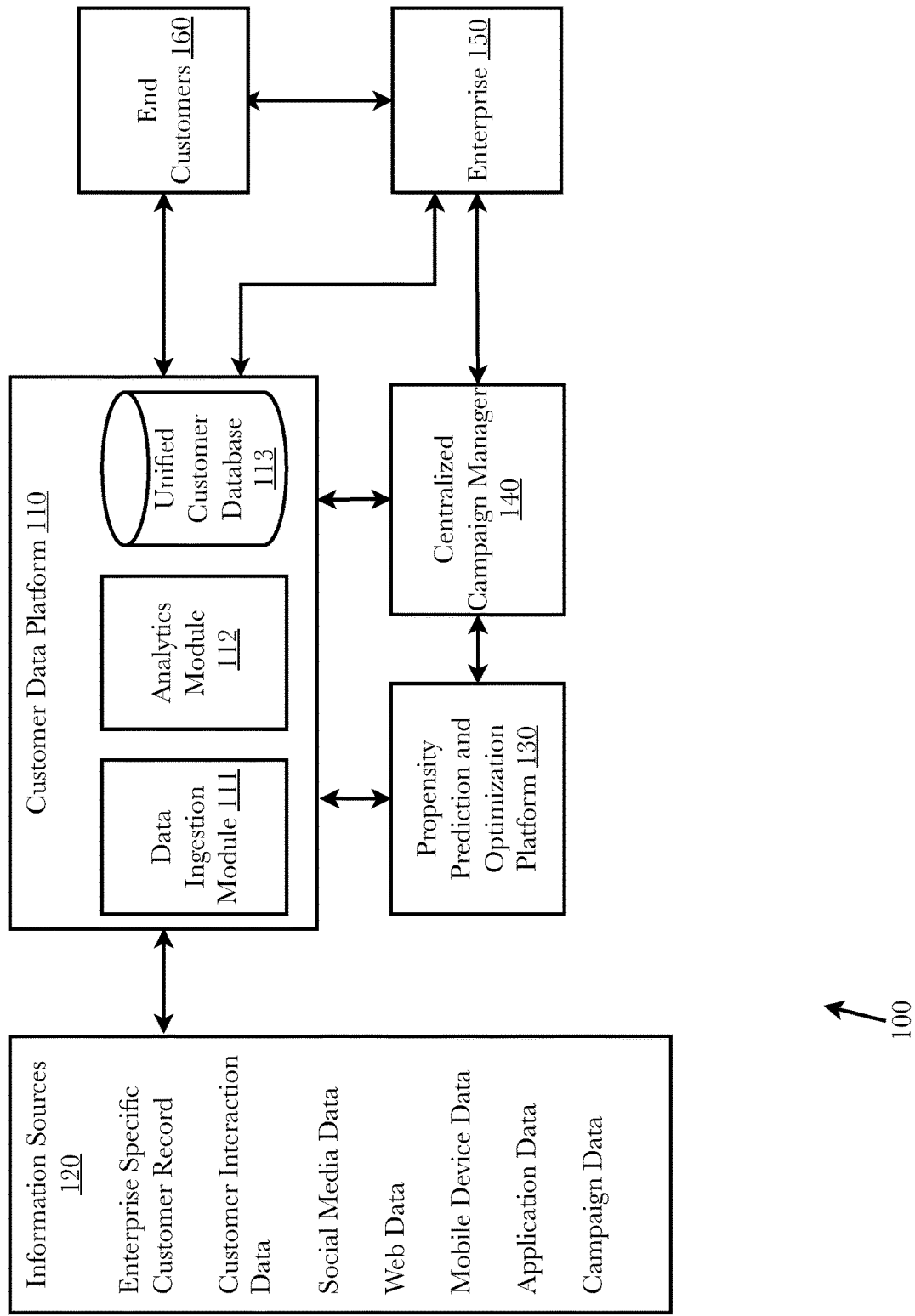
FIG. 1 is a block diagram illustrating an exemplary system architecture for adaptive campaign management utilizing a customer data platform, according to an embodiment.

The inventor has conceived, and reduced to practice, a system and method that provides adaptive campaign management and customer engagement predictions utilizing a customer data platform comprising an data ingestion module, an analytics module, and a unified customer database. Furthermore, the system and method ingest a plurality of disparate information related to a customer from various information sources such as enterprise specific customer records, social media data and metadata, web app data and metadata, and mobile device app data and metadata, transforms the ingested data into a standard data format, and correlates the transformed data with existing customer information to form a unified customer profile. The system uses machine learning for predictions and maintenance of customer profiles, and continuously and automatically updates the machine learning models over time. A collection of unified customer data profiles may represent a unified knowledge base of customer information that can be accessed by a plurality of enterprises for call campaign management.

The primary intent for any contact center is to maximize customer service. In today's world, it is more challenging than ever to contact customers whether selling a new product or collecting past due payments; hence, automated dialers came into existence and since then have become an integral part of most outbound collection, telemarketing, and outbound customer service strategies.

However, these devices working alone can neither determine when to contact which customers nor identify the best phone number (mode) to use. And that's where the Best Time/Right Person to Contact, identified henceforth as the acronym "BTTC", module comes in. BTTC is a machine learning model that predicts the right time to contact a customer and the best mode (phone number, email ID, etc.) within each channel (e.g., voice, email, SMS) to use for each time period during the day.

Additionally, customer retention is an increasingly pressing issue in today's ever-competitive commercial arena. Companies are eager to develop a customer retention focus and initiatives to maximize long-term customer value. Accordingly, as disclosed herein, customer churn risk is captured by a retention model (propensity to churn (P2C) model) that uses segmentation to assist in relationship-building, retention strategy and profit planning.

A propensity to churn (P2C) module analyzes the past behavior of previous and existing customers to make future predictions. To avoid losing customers, a company needs to examine why its customers have left in the past. Likewise, 'Product Churn' is defined from the company's perspective as the loss of customers with regards to a specific product within the company. This could be due to the customer "upgrading", switching to another product within the same company, dropping the product altogether, or switching to a competitor's product. However, churn in these instances only considers voluntary leave by the customer and does not consider involuntary removal. Some examples of involuntary removal include the removal of a customer from a product due to non-payment or the sunsetting of a product. Moreover, the P2C model also predicts the order of churn for the customers, and, as a by-product, a "time until churn" estimate.

Collections is an age-old problem, but machine learning puts a new spin on this ever-competitive commercial arena. Call center administrators want to maximize their agent resources by making sure that they are calling customers who are willing to pay their bills. Looking at customer demographics, segmentations, similar customers, the individual payment history of a customer, and other data points, AI can not only provide guidance on who is likely to pay anything but also give an idea of how much the customer will be willing to pay.

The propensity to pay (P2P) model is built to determine a customer's payment patterns and ability to pay. The P2P model contains multiple machine learning and statistical models and is deployed to determine the probability that a customer will make any non-zero payment against a given bill and if a reminder is likely to help the customer to pay. According to one embodiment, if the customer is likely to pay anything, then an expected payment amount is created and also calculated separately to measure the amount that is liable to get collected at the stipulated time. According to another embodiment, if the customer is likely to pay anything, two additional expectations are further created: the expected payment amount, and a time-related expectation for the payment (not when they will pay, but if they will pay by X date where X is dynamic and supplied by the user).

Furthermore, these models are used collectively within a propensity prediction and optimization platform that may be integrated into already existing modern-day call center and business infrastructures. Various implementations are anticipated such as cloud-based, on-premises, or a hybrid of the two. The propensity prediction and optimization platform is a unified platform for predictions, campaign management, dialing, and messaging and built on a rich set of customer data. The propensity prediction and optimization platform can act both as a stand-alone solution with exposed API endpoints or as an add-on within our other products. It features efficient prediction dialing with strict adherence to applicable regulations and fully automated end-to-end interaction lifecycle starting from record ingestion to prediction to dialing. Predictions are manifested from machine learning models that ingest multidimensional datasets which further inform one or more additional machine learning models in order to optimize agent tasking on a daily basis. The following is a description of the three machine learning modules (BTTC, P2C, and P2P) used in one embodiment.

BTTC is a machine learning module configured to predict the right time to contact a customer and the best mode (phone number, email ID, etc.) within each channel (e.g., voice, email, SMS) to use for each time period during the day. Application of the Best Time to Call (BTTC) model involves building an automated engine which aims at reducing the call retry attempts and maximizing the successful call connections by predicting the best time slot during which a customer can be approached during the day, and recommending the right phone number to be used during the best time slot during which the call would be made. The dialer uses the above intelligence to dial out the calls at the most suitable time when the customer is expected to answer there improving the efficiency.

The BTTC model is defined as a classification problem that determines a multiclass target, i.e., the best time slot and the corresponding mode type through which the customer can be approached for a call. The target variable here, timeslot, may be derived from the dialer time on grouping the time into intervals of 15 mins time slot, as one example. The application supports data from different time zones across the globe and hence the target variable may be defined against 96 classes, i.e., 15 mins time window on 24 hours (24*4). This is one example of a default timeslot cadence (15 minute time windows), but it could easily be adjusted to fewer timeslots in a day or more, or as desired. This time window definition here is configurable and is recommended be set in the initial model building stage. The model will be developed based on the configured time interval. Any update on the interval that may need to be attempted at a later stage will call for a rebuilding exercise on the model. The mode type is added as an independent variable into the model and hence the time slot prediction is done against the mode types available for the customer. The model is built against the past contact history variables, customer specific attributes and campaign related variables to predict the best time slot.

One use case comprises call history details. Past call history patterns, contact details and campaign details may be used to predict the best time to contact a customer. Data from the LCM (List & Campaign Manager) database is used primarily here. It helps business to gauge the call picking patterns of customers and use this information to improve the efficiency in dialing out to the customer. Another use case is finding similar customer BTTC slots. BTTC slots across similar type customers will help in determining the BTTC slots of unknown customers whose data is not present in the LCM database. This will act as the first gauge mechanism to dial out calls on unknown contacts. Yet another use case is finding similar Campaigns BTTC slots. BTTC slots across campaigns will help business evaluate the effectiveness of targeting such campaigns on customers. Yet another use case is determining agent effectiveness on outbound calls. Agent effectiveness on connecting to customers on campaigns can be effectively gauged through BTTC slots and their outcomes. And yet one more use case is weekday wise seasonality. Weekday wise seasonality patterns on calls can be used to effectively gauge if day of week also contribute to the BTTC patterns of customers. This can further be tied effectively for effectively managing calls between customers.

Consider the following exemplary equation to understand the "Target" and "Features" associated with a BTTC model: Phone Success=Customer Call History+Customer Profile+Campaign Details+Interaction History. Here, Phone Success is the target variable and Customer Call History, Customer Profile, Campaign Details, and Interaction History are features.

Assume Phone Success is divided into Yes/No or 1/0. In machine learning, this is a binary classification. A binary classification means the target has exactly two possible values, and each record is assigned to one and only one target label. The machine learning model predicts the probability that a new observation is in either class and returns the class with the highest probability. To wit, an outbound call can either be answered or not. The model will predict the probability of both that the call will be answered and that the call will not be answered (i.e., 1— probability that the call is answered). It returns the class (answered, not answered) most likely to be true, and the associated probability between 0 and 1.

The below table illustrates a list of exemplary business data categories considered while drawing the possible list of variables and scenarios that go into a model for BTTC module. This table is non-exhaustive and here for exemplary purposes.

| Business Category Name | Business Category Description |
|---|---|
| Customer Call History | Understand the patterns related to when the customer calls the company, when the customer answers a company call, when the customer does not answer a company call, and the phone numbers (modes) used at each interaction. |
| Customer Profile | Understand customer demographics including geography, income level, education level, and other profile details to identify direct impact on success rates as well as identifying similar customer success rates. |
| Customer Feedback or Net Promotor Score (NPS) | Understand how the customer feels about the company; this might be estimated or have other proxies if an NPS or feedback does not exist by the customer such as sentiment analysis on conversations relating to the product, referrals by the customer to someone else, usage of products, on-time payment frequencies, similar customer NPS scores, or some other format. |
| Campaign Details | Understand the campaign goals, details, history, and rules to identify the impact of customer success rates and/or similar campaigns |
| Passive Interaction History | Understand how often the customer uses available resources that do not require agent skills such as website usage, app usage, IVR usage, etc. |

The following is a table of exemplary features that may be considered for analysis:

| CustomerID | CampaignID | CallType |
|---|---|---|
| CustomerIsActive | CampaignActiveFlag | CampaignKey |
| CustomerRegistrationDate | CampaignGoal | ConditionID |
| CustomerDeregistrationDate | InteractionID | ContactTries |
| VoiceHomePhoneAvailableFlag | InteractionThreadID | DialerTime |
| VoiceMobilePhoneAvailableFlag | ResolutionThreadID | EmailThreadID |
| ProductFamily | ChannelID | IsComplianceDNC |
| ProductDeregistrationDate | DispositionCode | IsLitigated |
| InteractionDirection | IsRightParty | Mode |
| VoiceWorkPhoneAvailableFlag | CallbackRetries | ZoneName |

BTTC models may include one or more separate models; however, according to one embodiment, three types of models are disclosed, which are a full model, persona model, and a call history model. According to one embodiment, the full model may only be used for those customers who have been dialed out at least 5 times in the past. This will look at customer's specific relationship history with the business among other features as described above in the Business Categorization section. The persona model is for new customers with insufficient personal historical information. One definition of new customer may be any customer with less than 5 customer interactions, as an example. The model may use, instead, the churn history of similar customers with longer history in combination with the customer's demographics and other features to predict the likelihood of churn for newer customers. The call history model will be considered only for blind leads who have been contacted multiple times in the past and are not a customer yet.

Further details regarding the call history model include contacts that are called multiple times but are not officially considered customers. As such, these contacts may not exist within the CRM (Customer Relationship Management) since the customer has no official relationship with the company. However, the call history model may have called the phone number before in a previous campaign or even previously within the same campaign. It is important to try to utilize this information when available. Hence, the call history model will consider the customer demographics, but more importantly, it will also consider the call history of the contact such as features like, but not limited to, previous success rates, channels used, times called, and analogous historical information from similar contacts who also are not customers. It important to note that one or two previous calls does not make a pattern, so while it can be used, it cannot be relied upon by itself. In that case, the model would rely more on historical information on similar customers. In the case when no historical contact information exists for a contact, the model would switch to the persona model.

Regarding the persona model, not every contact will have historical records. Some campaigns are based on new leads with no data to use as features, contain brand new customers whose segmentation is a blank or null value, or will contain previously unseen values as features. That is when the model can only rely on general demographics or variables related to customers' characteristics. Demographic segmentation divides the market into smaller categories based on factors such as age, gender, area code, zip code, race, homeownership, and level of education etc. Specifically, demographic data relies on describing a customer without having to know contact history or the relationships between the customer at the company. Using only these pre-known demographics about current customers to build a persona model, any campaign with cold contacts or new customers can still utilize at least some version of a BTTC module.

Moving on to an embodiment arranged to determine a propensity to churn (i.e., "P2C") of a customer; that is, the likelihood of an individual to cease being a customer, which integrates various techniques of customer data analysis, modelling, and mining multiple concept-level associations to form an intuitive and robust approach to gauge customer loyalty and predict the likelihood of defection. This is achieved by running a series of machine learning models, the first of which divides previous and existing customers into churned (1) and non-churned (0), respectively. Based on this segregation, patterns are discovered across demographics and historical features including payment, purchasing, complaints, feedback scores, and more. Moreover, a separate model is built to estimate "tenure at time of churn" taking into account both the tenure at time of churn for previous customers and the tenure of existing customers yet to churn. These models are then applied to the existing customer base. First, the model classifies the existing customers into "likely to churn" and "not likely to churn" buckets. For those likely to churn, the second model is executed to estimate the time until churn in days relative to the current date. This process of analyzing and calculating the estimate time to churn is called as Survival Regression Analysis. The accuracy of this model is derived from correctly estimating the order of which people churn; it does not try to minimize the difference in estimated churn tenure and actual churn tenure.

The below table illustrates a list of exemplary business data categories considered while drawing the possible list of variables and scenarios that go into a model for P2C. This table is non-exhaustive and here for exemplary purposes.

| Business Category Name | Business Category Description |
| --- | --- |
| Customer Payment History | Past transaction history of customers are used to study and analyze the future payment patterns of the customers. This helps the business in proactively identifying and grouping customers based on their propensity to pay and expected collection amount. This also becomes an important qualifier to run collection campaigns. Customers can be prioritized on these metrics while running campaigns. |
| Similar Customers | P2P Rate across customers of similar type can be defined on customer demographics, interaction metrics, activity type, etc. Patterns on P2P from similar customer types can be mined to uncover trends that may be visible. |
| Similar Products | The likelihood to pay rate across similar products or within similar product family groups is utilized to help estimate the likelihood against a specified product. This further helps the business to feature and strategize the products based on the end goals also. |
| Similar Campaigns | The likelihood to pay rate across similar campaign types and groups can also be defined. Patterns on P2P from similar campaigns can be utilized to help understand the pay rates of the current campaign. Campaign goals can be further tied here to gauge the effectiveness of the campaigns. |
| Agent Effectiveness | Agent metadata and skill definitions can help identify a customer's likelihood to pay and expected collection amount. Businesses can further map the agent skill sets to the underlying campaigns and their P2P metrics in order to identify the right skill set group for the right set of customers. |
| Complaints | Complaint data can be consumed to understand if any patterns exist between the payment metrics and the complaints received. Quick resolutions to such cases may help in increasing the P2P Rates. |
| Specialty Programs | Understand the purchasing circumstances to see if there was any alternative benefit for the customer to make the purchase other than just the desire of the product; this includes discounts, cash back, savings, loyalty program benefits, points, flight miles, gas points, etc. The historical or continued success of these benefits might play a role in identifying payment metrics. |
| Customer Interaction History | Past interactions over voice, email and chat can be utilized to understand possible relationships between these items and payment metrics. This would help further help the business to track the pain points that customers face across these channels if any and introduce measures to improve its effectiveness. |
| Customer Feedback or NPS | Understand how the customer feels about the company; this might be estimated or have other proxies if an NPS or feedback does not exist by the customer such as sentiment analysis on conversations relating to the product, referrals by the customer to someone else, usage of products, on-time payment frequencies, similar customer NPS scores, or some other format. |

P2C models may include one or more separate models, however, according to one embodiment, two types of models are disclosed, which are a full model and a persona model. The full model will be considered for those customers who have successfully been with the company for at least three (3) billing cycles. This will look at customer's specific relationship history with the business among other features as described above in the Business Categorization section.

The persona model comprises new customers with insufficient personal historical information will be considered under this model. According to one embodiment, any customer with less than three (3) billing cycles of any product is a new customer. The model will use, instead, the churn history of similar customers with longer history in combination with the customer's demographics and other features to predict the likelihood of churn for newer customers.

Furthermore, the persona model details that not every customer will have enough historical records. Some campaigns will contain brand new customers whose segmentation is a blank or null value, will have little to no history as a new customer, or will contain previously unseen values as features. That's when the model relies most on general demographics or variables related to customers' characteristics that can be generalized across similar customers. Demographic segmentation divides the market into smaller categories based on factors such as age, gender, area code, zip code, race, homeownership, and level of education etc. Specifically, demographic data relies on describing a customer without having to know contact history or any relationship details between the customer at the company. Using only these pre-known demographics about current customers and their existing payment histories to build a persona model, any campaign with new customers or new values can still utilize at least some version of a propensity to pay model.

Moving on to the Propensity to Pay (P2P) module, the P2P module will yield a set of results including the probability for non-zero payment, the propensity for non-zero payment, the proportion of the bill expected to be paid, the probabilities the customer will pay the bill across multiple time-frame options, a probability that the customer needs a reminder, a reminder needed flag (binary version of reminder probability), and the probabilities of success if a reminder is sent spanning multiple time-frame options. These are described in more detail below. Most of these results stem from a binary classification model, but the proportion to be paid is a regression-based model. A binary classification machine learning model is classifying observations into one of two classes, i.e., whether the customer is likely to make a payment or not within the stipulated time period. Moreover, a regression machine learning model is a numeric prediction and usually are less reliable to provide accurate values. These models are both compared against a host of variables on the customer such as past transaction history, interaction history, customer profile, etc. Features to be used are described in more detail in the Business Categorization section below.

The following metrics are defined by the model: Probability to pay—the probability that the customer will make any non-zero payment towards a given bill, Propensity to pay—a binary value of 1 or 0 that describes the expectation that customer will make a non-zero payment towards a given bill, Expected proportion to pay—a decimal value between 0 and 1 that describes the percentage of the billed amount that the customer is likely to pay, Expected amount to pay—the expected amount the customer will pay at the time of payment; a calculated field of the expected proportion multiplied by the billed amount, Expected time to pay—the amount of time (in terms of days) the customer will take in order to pay the outstanding dues, Recommendation to send reminder—This response is a set of 3 time values, namely pre-due date, on due date, and post-due date, and their respective binary responses of 1="helpful" or 0="not helpful". A reminder is considered "helpful" differently at each time interval: 1) if the reminder is sent pre-due date and the customer pays on or before the due date, 2) if the reminder is sent on the due date, then the customer makes a payment on the due date, or 3) if the reminder is sent post-due date, then the customer makes a payment post-due date. All conditions are also subject to a "3 day" rule saying that the reminder is only helpful if the customer pays within 3 days of the reminder, and Recommended time and channel to remind—Assuming a reminder is helpful, then this responds with the combination of recommended times (as described in 6) and the channels to use (voice, email, SMS) and models to use (mobile, business, home, email ID, etc.). For each combination, there will be a binary response of 1="recommended" or 0="not recommended". If a customer is recommended for a reminder and no combination is recommended, then the highest probability of time, channel, and mode combinations will always be 1.

The below table illustrates a list of exemplary business data categories considered while drawing the possible list of variables and scenarios that go into a model for P2P. This table is non-exhaustive and here for exemplary purposes.

| Business Category Name | Business Category Description |
| --- | --- |
| Customer Payment History | Past transaction history of customers are used to study and analyze the future payment patterns of the customers. This helps the business in proactively identifying and grouping customers based on their propensity to pay and expected collection amount. This also becomes an important qualifier to run collection campaigns. Customers can be prioritized on these metrics while running campaigns. |
| Similar Customers | P2P Rate across customers of similar type can be defined on customer demographics, interaction metrics, activity type, etc. Patterns on P2P from similar customer types can be mined to uncover trends that may be visible. |
| Similar Products | The likelihood to pay rate across similar products or within similar product family groups is utilized to help estimate the likelihood against a specified product. This further helps the business to feature and strategize the products based on the end goals also. |
| Similar Campaigns | The likelihood to pay rate across similar campaign types and groups can also be defined. Patterns on P2P from similar campaigns can be utilized to help understand the pay rates of the current campaign. Campaign goals can be further tied here to gauge the effectiveness of the campaigns. |
| Agent Effectiveness | Agent metadata and skill definitions can help identify a customer's likelihood to pay and expected collection amount. Businesses can further map the agent skill sets to the underlying campaigns and their P2P metrics in order to identify the right skill set group for the right set of customers. |
| Complaints | Complaint data can be consumed to understand if any patterns exist between the payment metrics and the complaints received. Quick resolutions to such cases may help in increasing the P2P Rates. |
| Specialty Programs | Understand the purchasing circumstances to see if there was any alternative benefit for the customer to make the purchase other than just the desire of the product; this includes discounts, cash back, savings, loyalty program benefits, points, flight miles, gas points, etc. The historical or continued success of these benefits might play a role in identifying payment metrics. |
| Customer Interaction History | Past interactions over voice, email and chat can be utilized to understand possible relationships between these items and payment metrics. This would help further help the business to track the pain points that customers face across these channels if any and introduce measures to improve its effectiveness. |

| Business Category Name | Business Category Description |
| --- | --- |
| Customer Feedback or NPS | Understand how the customer feels about the company; this might be estimated or have other proxies if an NPS or feedback does not exist by the customer such as sentiment analysis on conversations relating to the product, referrals by the customer to someone else, usage of products, on-time payment frequencies, similar customer NPS scores, or some other format. |

P2P models may include one or more separate models, however, according to one embodiment, two types of models are disclosed, which are a full model and a persona model. The full model will be used to describe those customers who have an occurrence of at least five (5) billing cycles. When described this way, the features will look at the individual customer's relationship history with the business among other features as described above in the Business Categorization section. The persona model details new customers, that is those with less than five (5) billing cycles, is assumed to have insufficient personal historical information to be considered in the machine learning model. Instead, clustering will be used to define similar customers and, using their aggregated history information, simulate the individual customer's history for the machine learning model.

In detail, the persona classification means the historical information of similar customers with longer history will be used in combination with the customer's demographics and other features to predict the different probabilities for the P2P model.

Populating probabilities and predicting the outcomes for Incumbents/Existing Customers is relatively easier than dealing with a new customer as they have insufficient personal history to be considered trustworthy and non-biased. The solution to this is finding similar customers for each of the new customers using Clustering and filling out their information from the obtained aggregated results. The aim of cluster analysis is to organize observed data into meaningful structures in order to gain further insight from them. Specifically, "KMeans" clustering model may be used as a supervised methodology to classify new customers as generic types of existing customers and assuming aggregations of those existing customer attributes against the new customers to use in predictions.

A feature to remind customers to pay is anticipated and described as follows. Channels used for reminders could be post mail, email, SMS, Interactive Voice Response (IVR), instant messaging, social media, or voice. A company presumably prefers their customers to be reliable. However, the company is not the only one who loses value when payments are missed. A large loss of value to the customer might be a blemished credit history or lower credit score which adversely impacts the customer's chance of availing any credit faculty in the future.

According to one aspect, blanketing all customers with reminders may not be the best approach due to operational limitations, cost inefficiencies, or potential negative customer experiences. In order to optimize company resources, the model may focus the resources first on customers where a reminder is likely to help. Such an implementation may remove both customers that do not need reminders and customers where reminders fall on deaf ears.

A task of the model is then to identify if a reminder is likely to be effective at multiple time frames within the billing cycle for each customer. For example, suppose Customer A has historically had trouble paying the bill at all. However, on the subset of instances where the customer received a reminder, the customer has a higher probability of payment than when no reminder is sent. The model will predict that Customer A needs a reminder.

Now suppose Customer B is a person that has historically always paid the bill on time. Suppose also that for current billing cycle, the payment happens to be late. The machine learning model might predict a reminder necessary after considering how many reminders have already been sent, today's date relative to the due date, the customer's personal payment history timing, and patterns extracted across similar customers.

The features used for this model contains the standard data points of customer demographics, personal historical payments, similar customer historical payments, product data, payment methods, complaint data, NPS or feedback data, etc., along with reminder history and effectiveness. The Target of this model is "Reminder Helpful" which is a binary (0,1) value—where the value would be a 1 if a reminder was sent and was deemed helpful, else 0—defined by the following conditions: Customers with no previous reminders, Customers with reminders sent for all previous bills, Customers that explicitly opt for a reminder or no reminder, Customers that consistently do not pay bills or have been sent to collections, and Customers who have historically or currently opted for AutoPay. Exemplary dataset definitions may comprise: Training data primary key needs to be at the "reminder sent" level, Reminder are classified as outbound communication through any channel including but not limited to SMS, email, and voice, Time is divided into categories (three by default): "pre-due date", "on due date", and "post-due date", and the target, "Reminder Helpful" is calculated for every reminder sent. Regarding the reminder helpful; If Reminder is sent "Pre-Due Date" and customer pays the bill in the next N number of days defined by the user and the bill was paid on or before the due date, then the reminder was effective, If Reminder is sent "On Due Date" and customer pays the bill on the same day i.e., the due date, then the reminder was effective, If Reminder is sent "Post Due Date" and customer pays the bill in the next 3 days, the reminder was effective, otherwise, the reminder was not effective. The model yields an output, "Send Reminder", of a probability between 0 and 1 that the customer is more likely to pay with a reminder than without one. This can use a cut-off threshold to turn the probability decimal into a binary value of 0 or 1. This threshold can be chosen in several ways, as known to those in the art.

The following is a table of exemplary features that may be considered for analysis:

| CustomerID | TransactionDate | ChannelID |
| --- | --- | --- |
| CustomerIsActive | ProductLifeCycle | BillAmount |
| DueDate | NewCustomerFlag | TransactionAmount |
| ProductFamily | InteractionID | BillAmount |
| InteractionStartTime | InteractionThreadID | DueAmount |
| CallBackAttemptType | ResolutionThreadID | ReminderFlag |

Other features of Propensity to pay data fields may comprise the following non-exhaustive exemplary list of: Due Dates, Customer IDs, Payment Dates, Payment Times, Billing Cycle, Product, Customer Birth Age, Gender, Nationality, Education Status, Employment Status, Occupation, Zip Code, State, Region, Income, emails, and phone numbers.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, models or the like may be described in a sequential order, such processes, methods and models may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or model is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Definitions

As used herein, "Customer Churn" is defined as the loss of one or more customers from the entire company.

Conceptual Architecture

FIG. 1 is a block diagram illustrating an exemplary system architecture for adaptive campaign management utilizing a customer data platform, according to an embodiment. According to the embodiment, adaptive campaign management system 100 may comprise a customer data platform 110 configured to receive a large plurality of customer data from various different information sources 120, transform the data as necessary, correlate transformed data with existing data and store the correlated data, and provide the stored data to one or more machine learning algorithms configured to predict business outcomes for an enterprise 150. In a preferred embodiment, customer data platform 110 is provided as a service that an enterprise 150 can use (e.g., subscribe to, license, etc.) by uploading, sharing, or otherwise granting access to its stored customer data to customer data platform 110. Integrated data from different customer records and enterprises assists system 100 in diagnosing customer activity and engagement opportunities by organizing data from different systems into a unified view of useful information from which useful insights and/or predictions can be made.

According to various embodiments, system 100 may be implemented as machine readable instructions (e.g., software) operating on hardware (e.g., stored in a memory and executable by one or more processors on a computing device). For example, customer data platform 110 may be a computer server and propensity prediction and optimization (PPO) platform 130 and centralized campaign manager 140 are services stored and operating on the server. According to some embodiments, system 100 may be a unified system wherein customer data platform 110, PPO platform 130, and centralized campaign manager 140 are all stored and operated on a single computing device, such as a server. In other embodiments, the system 100 may be a distributed system wherein customer data platform 110, PPO platform 130, and centralized campaign manager 140 may be stored and operated on separate computing devices located near each other and communicating via a network connection (e.g., LAN, WLAN, etc.), or the separate computing devices may be remote from each other such as in a cloud-based architecture.

Customer data platform is designed to manage and process large volumes of disparate data from various information sources 120. Some exemplary information sources 120 are provided as a non-exhaustive list of data sources that may be integrated into customer data platform 110. Information sources may comprise historical information regarding customer behavior and interactions with the system as well as real-time data status data associated with a customer, process, and/or system. PPO platform 130 can utilize the real-time data to perform "in moment" propensity detection which may be at the time of customer call or contact in order to improve the predictive capabilities of the underlying models such as the models which predict the propensity to pay, propensity to churn, and the propensity a customer answers a call. For example, if the customer had just placed an inbound call, sent an email, or browsing the enterprise website, then PPO platform 130 can infer that the customer is accessible and based on various real-time status information the system can engage the customer on email, initiate a voice call, etc. Similarly, in the example of a bank, if there is an inbound remittance, then PPO platform 130 can send the customer a real-time bill payment notification for pending payment.

Enterprise specific customer records may be obtained directly from an enterprise 150 and can include information such as a customer name, phone number, address, preferred digital consent channels, consent status, and any number of other fields of data which an enterprise may choose to keep a record of such as, for example, products/services related to a customer. Enterprise specific customer records may comprise prior express written consent (PEWC) contacts and non-PEWC contacts. Customer on PEWC and non-PEWC lists will have their consent status in their customer profile based on these lists.

Customer interaction data is related to historical interactions (meta-data about calls, emails, webchat, etc.) between a customer and an enterprise (or an intermediary representing an enterprise e.g., a contact center) and can include interactions conducted over various communication channels including, but not limited to, voice (e.g., telephone, VOiP, video, etc.) text, email, chat messages (e.g., via a webapp or enterprise application for a mobile device), social media, and any other channels that may be used to interact with a customer. Customer interaction data may be stored as part of an enterprise specific customer record and thus obtained when an enterprise uploads its customer records information.

Social media data is collected information from social networks that show how users share, view, or engage with content and profiles. Social media data associated with a customer may be obtained by connecting with a social media server. Customer data platform may retrieve a customer record, identify a customer name associated with the retrieved record, and query a social media server via an API to obtain social media data of the customer. Social media data may comprise information including, but not limited to, shares, likes (e.g., organic likes, page likes, profile likes, paid likes, etc.), mentions, impressions, hashtag usage, URL clicks, keyword analysis, new followers, follower list, comments, post reach, reactions, unlikes, profile visits, metadata, and many more types of information. By using social media data, customer data platform 110 can be leveraged to find answers to questions such as, Do users from Facebook file more customer support tickets?, or Do users who subscribe to an enterprise-specific social media page make payments regularly?, or any host of other questions which an enterprise may be interested in knowing the answer to in order to enhance business outcomes and/or improve customer engagement.

Web data may be any data that is sourced from enterprise associated webpages or webapps including customer metadata. For example, web data may be obtained from a banking webapp that an financial enterprise maintains so that its customers can interact with the bank and access its services and products. Customer profile data associated with the webapp, and metadata associated with the customer profile may be obtained and ingested by customer data platform 110 and added to the customer profile in unified customer database 113.

Mobile device data may be any data obtained or derived from a customer's mobile device. This may be related to software application data that can also be obtained from a customer's mobile device. For example, a cable service provider may have a software application that its customers can download onto their mobile device that allows them to configure their profile, make payments, change services/products, interact with their cable device, and chat with customer service. Any interactions the customer has on the mobile device application may be captured and stored in a customer profile on the mobile device. This profile and any application interactions may be obtained by customer data platform 110 and added to the customer profile stored in unified customer database 113. Additionally, when a customer downloads the enterprise-specific application on their mobile device, they may be prompted by the application to grant permission for the application to access other applications on the mobile device. In this way, mobile device data may be obtained by customer data platform 110. In some embodiments, a customer mobile device may have an application stored and operated on the mobile device which allows customers to give consent for calls via one or more digital channels and which supports blockchain network functionality. Consent data may be obtained and stored by customer data platform 110.

Campaign data associated with a call campaign may be obtained by customer data platform 110 and may comprise campaign goals, details, history, call list, rules, and outcomes. Historical campaign data may be used as part of the initial training datasets by analytics module 112 in order to configure one or more machine learning algorithms to make predictions to enhance business outcomes and customer engagement.

According to the embodiment, customer data platform 110 may comprise a data ingestion module 111 configured to receive, retrieve, or otherwise obtain a large plurality of data from a plurality of different enterprises and systems and process the plurality of data through one or more highly scalable and extensible data pipelines to prepare the data for storage in unified customer database 113, and an analytics module 112 configured to receive, retrieve, or otherwise obtain data, either already processed or as raw data, input the data into one or more machine learning algorithms configured to generate predictions to enhance enterprise outcomes and customer engagement. More specifically, according to some embodiments, analytics module 112 trains and deploys one or more deep reinforcement learning neural networks capable of making customer predictions based on a wide range of features derived from the stored customer data profiles in unified customer database 113.

According to some embodiments, unified customer database 113 may comprise one or more separate databases. For example, a relational database (e.g., MS SQL server, etc.) may be used for structured data and a NoSQL database (e.g., MongoDB, etc.) may be used for unstructured data. When using a relational database, all data may be transformed into a standardized data format for both storage and algorithmic processing. In some embodiments, unified customer database 112 can be a data warehouse that integrates, among other things, transaction data from disparate source systems and provisions them for analytical use. No matter the form or design of the data storage system, it should be able to perform queries and support analysis. Data stored in the unified customer database 113 may be encrypted according to an encryption scheme known in the art to protect the privacy and data of the individuals in the database.

Also present in this embodiment, are a propensity prediction and optimization platform 130 and a centralized campaign manager 140 which may be communicatively coupled to customer data platform 110 and each other. Propensity prediction and optimization platform 130 may receive, retrieve, or otherwise obtain customer data from customer data platform 110 and input the customer data into one or more machine learning models operative to output predictions to enhance business outcomes for an enterprise 150. PPO platform 130 may comprise one or more models for making predictions such as the BTTC model, P2P model, and P2C model. The output generated from these may be customer specific and sent to customer data platform 110 wherein the output can be added to the specific customer's profile. PPO platform 130 can be configured to periodically run customer data through its one or more models as new customer data is ingested by customer data platform 110 and the output corresponding to this new input data can be saved to the customer profile in unified customer database 113. In this way, customer profiles and machine learning models are continuously updating and adapting to new information which allows an enterprise 150 to have a clear and present view of its customers 160, which can be benefit business operations.

According to the embodiment, the centralized campaign manager (CCM) 140 is configured to receive, augment, or create an outbound call campaign and to obtain call consent from customers 160 via one or more digital channels. Digital channels may be any form of communication that is non-voice and non-telephony such as, for example, text message, email, social media channel, via mobile application (app) such as an enterprise specific software application (e.g., banking app associated with banking institution, etc.) or mobile game, and using smart contracts leveraging a block chain network. In some embodiments, a smart contract may be generated between an enterprise 150 and an end customer 160 which requires customer consent for a phone call, and when customer consent is granted, the smart contract executes and the customer's profile data is updated to reflect the change in consent status and then the customer may receive a call as part of an outbound call campaign. For more detailed description of centralized campaign manager 140 refer to FIG. 5 below.

According to some embodiments, the unified customer profile stored in unified customer database 113 may comprise a data field which indicates the current consent status of the customer. Further according to some embodiments, the customer data profile may comprise a data field which indicates a preferred digital communication channel of the customer. If a customer profile does not have a current consent status or if a new consent status is to be acquired for a new purpose (e.g., consent for calls, consent for email, consent for instant email, etc.) then a customer identifier (e.g., name, customer data platform ID number, customer profile data address in the data storage system, etc.) may be sent to CCM 140. CCM 140 can receive this customer identifier, or otherwise retrieve the appropriate customer profile from unified customer database 113 as instructed by customer data platform 110, retrieve information about the customer preferred digital channels, if available, and attempt to obtain consent to receive a telephone call as part of an outbound call campaign via one or more digital channels (e.g., text, email, instant message, web app, mobile phone app, blockchain based smart contract, etc.). Once consent has been obtained, CCM 140 can update the customer profile with new consent status or send the new consent status to customer data platform 110 which then updates the customer profile in unified customer database 113, depending upon the embodiment of the system.

Figure 2:
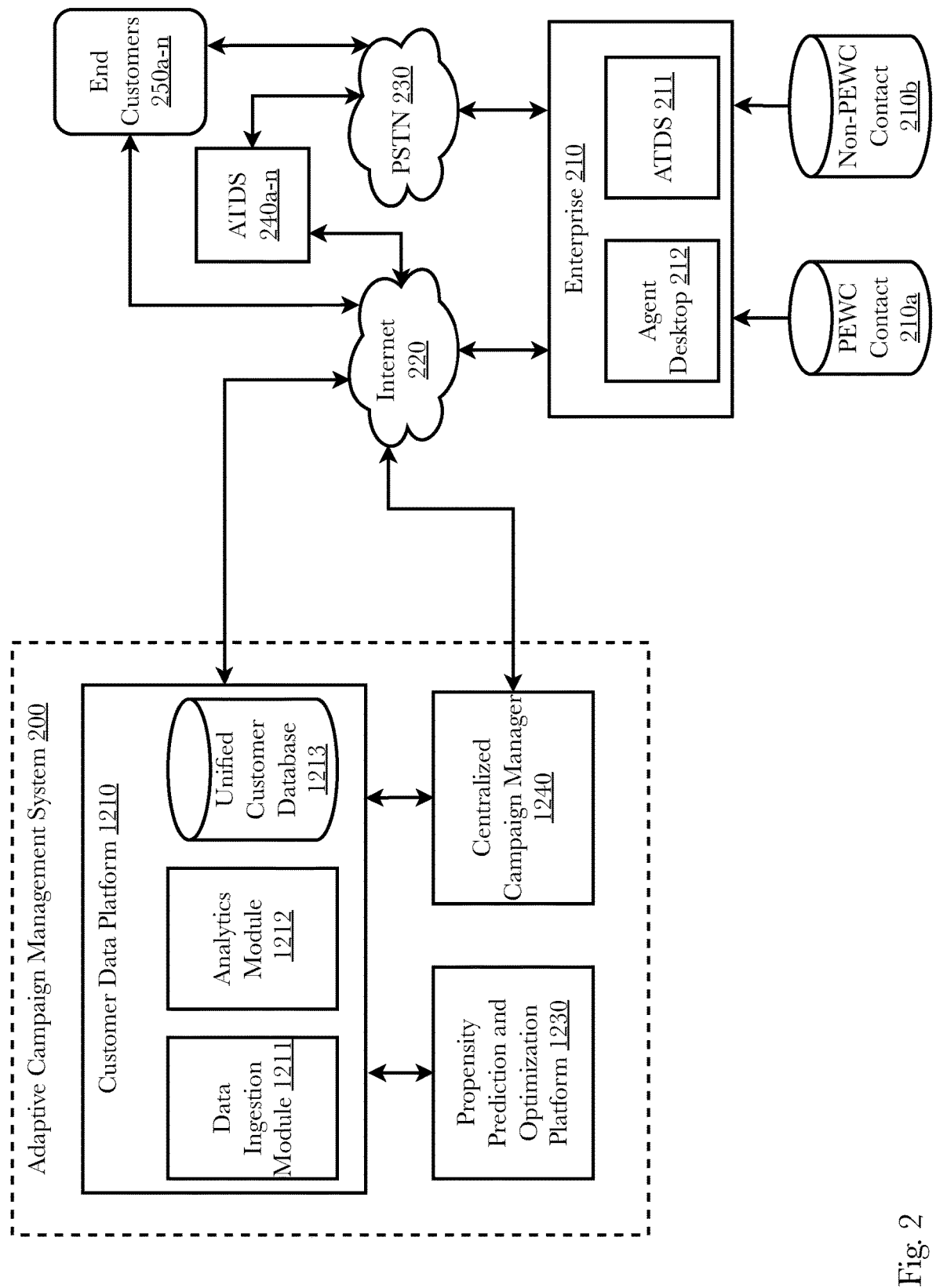
FIG. 2 is a block diagram illustrating an exemplary system architecture for adaptive campaign management utilizing a customer data platform with additional infrastructure to execute call campaigns, according to an embodiment.

FIG. 2 is a block diagram illustrating an exemplary system architecture for adaptive campaign management utilizing a customer data platform with additional infrastructure to execute call campaigns, according to an embodiment. According to the embodiment, adaptive campaign management system 200 may comprise customer data platform 110, PPO platform 130, and CCM 140, and may be connected to both an enterprise 210 and a plurality of end customers 250a-n via a suitable communication network such as the Internet 220. Additionally, there may be a plurality of auto-dialing systems (ATDS) 240a-n and 211 which can be used to conduct call campaigns created, managed, and analyzed by adaptive campaign management system 200. Customer data platform 110 may be used to predict customer engagement using information stored in unified customer database 113 and fed into one or more machine learning algorithms configured to make predictions on customer behavior. Customer engagement predictions and propensity predictions may be sent to CCM 140 which can create call campaigns comprising call lists of customer records and perform consent acquisition functions via one or more digital channels. A created campaign (and its associated list) may be sent, via the internet, to independent, third-party ATDS 240a-n and/or to an enterprise 210, which may be a contact center with its own ATDS 211 and multiple agent desktops 212. Adaptive campaign management system 200 can support such multi-dialer systems such as these. At the ATDS 240a-n, 211, the dialers work their way through call list and place a phone call over a public switched telephone network (PTSN) 230 to one or more end customers 250a-n. Once a dialed number has been answered by a customer, it can be sent immediately to an available agent desktop 211 so that the customer may speak with a live agent after having answered the call originated from one of the dialers. Additionally, an enterprise 210 may have stored lists of PEWC contacts 210a and non-PEWC contacts 210b which can be uploaded directly to customer data platform 110. Customer data platform 110 can receive these lists from enterprise 210 and correlate them with and then update existing customer profiles in unified customer database 113. According to the embodiment, end customers 250a-n may connect with system 200 via the Internet in order to provide consent for calls and other customer data, at the customer's own discretion. All data that is obtained from enterprise 210 and/or end customers 250a-n may be encrypted prior to being stored in unified customer database 113.

Figure 3:
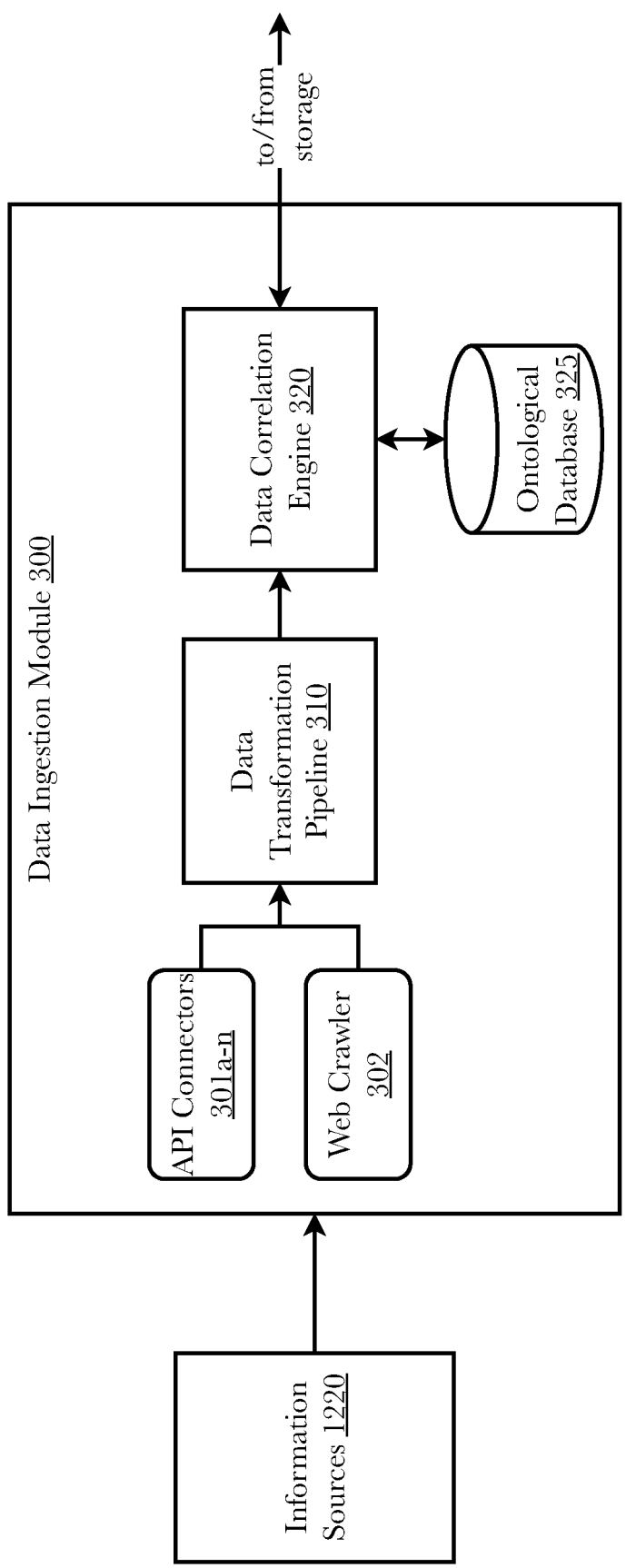
FIG. 3 is a block diagram illustrating an exemplary aspect of a system for adaptive campaign management utilizing a customer data platform, a data ingestion module.

FIG. 3 is a block diagram illustrating an exemplary aspect of a system for adaptive campaign management, a data ingestion module. According to some embodiments, data ingestion module 300 may comprise a data transformation pipeline 310 configured to integrate received data 120 into a standardized format suitable for storage and further processing by system 100 components, a data correlation engine 320 configured to receive integrated data from data transformation pipeline 310 and associate it with corresponding data profiles as necessary and supported by an ontological database 325, and various mechanisms 301, 302 for ingesting disparate data from a plurality of sources. Data ingestion module 300 is responsible for connecting with different sources of data, ingesting data from each of the different sources, integrating the data (e.g., transforming, cleansing, pre-processing, etc.), and correlating the integrated data with existing (if any) data structures stored in one or more centralized databases.

According to an embodiment, data ingestion module 300 may be designed based on an extract, transform, and load (ETL) framework where data is physically extracted from multiple source systems, transformed into a different format (if necessary), and loaded into one or more centralized data stores. An ETL suite 210 of tools may be used in this process. Data ingestion and integration plays an important role in adaptive campaign management. Integrated data from different customer records and enterprises assists adaptive campaign management system 100 in diagnosing customer activity and engagement opportunities by organizing data from different systems into a unified view of useful information from which useful insights and/or predictions can be made. Effective data acquisition and integration also improves claims processing accuracy for enterprises and ensures a consistent and accurate record of customer names, contact information, and various other customer related information. Data ingestion module 300 provides advanced data integration processes developed to manage the enormous volume, variety, and velocity of data, and combines data from sources such as, for example, web data, social media data, customer interaction data, enterprise-specific customer data, machine-generated data, data from the Internet of Things (IoT), into a single framework. According to an embodiment, data ingestion module 300 employs real-time integration techniques, which complement traditional ETL technologies and add dynamic context to continuously streaming data.

According to the embodiment, data ingestion module may comprise various mechanisms for extracting and ingesting a plurality of data from multiple information sources 120. One such mechanism may be one or more application programming interface (API) connectors 301a-n configured to act as an intermediary between data source systems and data ingestion module 300. In some embodiments, API connectors 301a-n may be RESTful state applications that perform tasks using a Representational State Transfer (REST) framework to acquire and transfer data from information sources 120. Oftentimes, popular data storage systems with a lot of users have built-in API functionality that allows a data storage system user to interact with their data stored in such a system. In this case, data ingestion module 300 may simply expose these API endpoints and connect with the data systems to extract and ingest the information stored therein. API connectors 301a-n may be used to integrate with database servers, web servers, and application servers in order to facilitate data transfer.

Another mechanism that can be implemented on data ingestion module 300 may be web crawler 302 bot configured to crawl websites and database to identify and extract information relevant to enterprise customers. Data gathered via web crawler 302 may be processed as unstructured data and assigned to an appropriate data transformation pipeline 310 to handle unstructured data.

Data transformation pipeline 310 may describe an automated process, or set of processes, in which one or more mechanisms and or techniques are used to clean, map, and transform received data into a format or data structure which is compliant with system storage and data analysis components. Data ingestion module 300 and, more specifically, data pipeline 310 are designed to reduce the amount of time and labor required to integrate large, disparate datasets by implementing data transformation logic to form a data pipeline. According to various embodiments, one or more data pipelines 310 may be operative at any given moment such as in parallel operation, and the number of parallel pipelines operating simultaneously may be dependent upon the hardware and software resources available. For example, in one embodiment, data ingestion module 300 is a computer server and the amount of data pipelines that can be operated by the server depends on the available processing capabilities of the server and/or any connected computing devices. Because of this architecture, data ingestion module 300 provides scalable data integration for massive amounts of disparate data from a plurality of sources. For example, consider that the system 100 stores all data in JavaScript Object Notation (JSON) format in a centralized SQL database (e.g., unified customer database 113) and a database from each of two different enterprises is to be ingested by data ingestion module 300. The first enterprise stores its information in a comma separated variable (.csv) format while the second enterprise stores its information in JSON format. During ingestion, the first enterprise's information would pass through data pipeline 310 and one of the processes would transform the .csv format data into JSON format data, and the second enterprise's information would not require a format transformation, as it is already in the correct format (JSON), but it would still be processed in data pipeline in order to cleanse and map the data as needed.

In some embodiments, one or more data pipelines 310 exist and each pipeline may be configured to process a certain type of data. For example, a data pipeline may be configured which specifically integrates ingested data that is of the .csv type. As another example, a data pipeline may be configured which specifically integrates ingested data which is in XML format. In other embodiments, each data pipeline 310 may be configured to first determine the current format of any received data, and then to adaptively configure the rest of the pipeline processes based on the format determination.

According to an embodiment, data transformation pipeline 310 may be configured to process streaming data and batch data separately. Streamed ingestion is chosen for real-time, transactional, event driven information sources, for example a credit card swipe that might require execution of a fraud detection algorithm. Batched ingestion is used when data can or needs to be uploaded in batches or groups of records.

In some embodiments, each data transformation pipeline 310 may be configured to perform data encryption on ingested data, wherein the data is encrypted and an encryption key is created which can be used to encrypt and decrypt data necessary. In one embodiment, the advanced encryption standard (AES) may be used to perform data encryption tasks. AES is a trusted standard algorithm which uses 128-bit keys for encrypting data and is especially resilient against malicious attacks with the exception of brute force attacks. In other embodiments, an RSA standard may be used for encryption. RSA is a public-key encryption asymmetric algorithm and the standard for encrypting information transmitted via the internet. RSA encryption is robust and reliable because it creates a massive bunch of gibberish that frustrates would-be hackers, causing them to expend a lot of time and energy to crack into customer data platform 110 systems. In cases where an enterprise stores its customer information in an encrypted format, sharing of the key between the enterprise and customer data platform 110 may be performed prior to enterprise data ingestion, so as to ensure that the encrypted enterprise data may be decrypted and encrypted again to comply with system 100 encryption standards.

A data correlation engine 320 may be present and configured to correlate or map transformed data with the appropriate customer profile and/or enterprise profile. Data correlation engine 320 provides capability for extracting data fields from one or multiple source files and matching them to their related target fields in the unified customer database 113. Source-to-target mapping integration tasks vary in complexity and the level of intricacy depends on the data hierarchy and the disparity between the data structure of source and target. Whether on-premise or cloud-based, every enterprise application uses metadata to explain the data fields and attributes that constitute the data and semantic rules. These rules govern how data is stored within that application or repository. The goal of data correlation engine is to ensure a seamless transfer process from source to destination without any data loss. Data correlation engine 320 may receive, retrieve, or otherwise obtain customer data from unified customer database 113 in order to perform data mapping, and may send properly mapped data to unified customer database 113.

An ontological database 325 may be present and used to during data mapping tasks in order to match source data with a target location. An ontology is a set of concepts and categories in a subject area or domain that shows their properties and the relations between them. Ontologies may be enterprise specific and uploaded by an enterprise to data ingestion module 300. According to some embodiments, an ontology may be created automatically from the large datasets stored in customer data platform 110. Ontological database 325 may provide the rules and semantics required to effectively and efficiently map customer data from a plurality of sources (e.g., enterprises, etc.) into a unified customer profile stored in unified customer database 113. For example, Microsoft Dynamics CRM contains several data sets that comprise different data object, such as Leads, Opportunities, and Competitors. Each of these data sets has several fields like Name, Account Owner, City, Country, Job Title, and more. The application also has defined schema along with attributes, enumerations, and mapping rules. Therefore, if a new record is to be added to the schema of a data object, a data map will need to be created from the source fields to the Microsoft CRM account. Data mapping of such large and disparate datasets can help streamline data processes. For example, in contact center environment, source-to-target mapping of customer data helps achieve interoperability for customer records by matching the data between the source and target. It also helps enterprises share critical customer information and combine customer record data from various databases, data sources, and systems. Once data has been mapped and transformed, it may be fully integrated into unified customer database 113.

Figure 4:
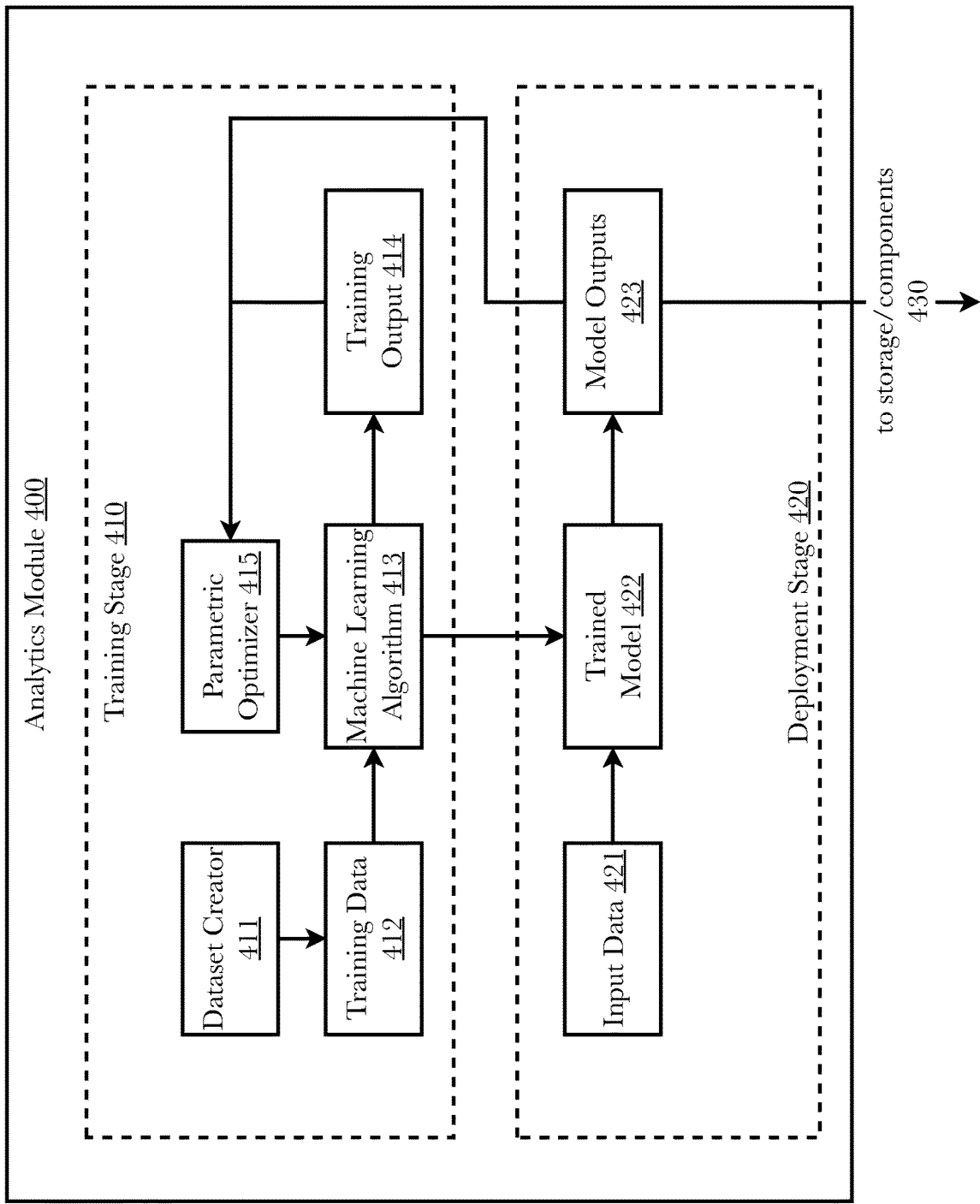
FIG. 4 is a block diagram illustrating an exemplary aspect of a system for adaptive campaign management utilizing a customer data platform, an analytics module.

FIG. 4 is a block diagram illustrating an exemplary aspect of a system for adaptive campaign management utilizing a customer data platform, an analytics module. Analytics module 400 can be configured receive, retrieve, or otherwise obtain a large plurality of customer data, analyze the plurality of customer data using one or more machine learning algorithms configured to receive as input customer data and to produce as output predictions associated with a customer or customers. Within analytics module may be a training stage 410 wherein the one or more machine learning algorithms may be trained to create a working model that can be deployed in a deployment stage 420 where the working model can make predictions using non-training or testing data.

At the training stage 410, a dataset creator 411 may be configured to obtain a subset of data (e.g., customer records) from unified customer database 113 and create separate training and testing datasets to be used for machine learning algorithm training and configuration. Dataset creator 411 may receive as inputs parameters that indicate how the training and testing datasets should be created. For example, dataset parameters such as batch size may be considered by dataset creator 411 when creating training datasets. Generally, from a batch of training data, dataset creator 411 will use about ninety percent of the batch as training data, while the remaining ten percent of data can be used as a test dataset. Training dataset is the initial data that is used to develop a machine learning model, from which the model creates and refines its own rules. A test dataset may be used as input to a machine learning model to test its outputs for accuracy and to inform model optimization tasks.

According to an embodiment, training data 412 may comprise the following non-exhaustive list of information, stored customer records from unified customer database 113, propensity predictions (BTTC, P2P, P2C) from PPO platform 130, historical customer transactions, historical campaign details including campaign outcomes and similar campaigns details, social media data, web app data, and mobile device app data. This, and other information may be fed as input into one or more machine learning algorithms 413 configured to make predictions about customer engagement.

According to a preferred embodiment, the one or more machine learning algorithms 413 comprises at least a deep learning neural network. According to an aspect, the deep learning neural network is a deep reinforcement learning network. Reinforcement learning considers the problem of a computational agent (i.e., machine learning algorithm) learning to make decisions by trial and error. Deep reinforcement learning (deep RL) incorporates deep learning into the solution, allowing agents (algorithms) to make decisions from unstructured input data without manual engineering of the state space. Deep RL algorithms are able to take in very large inputs (e.g., various customer data across multiple enterprises for a large plurality of customers) and decide what actions to perform to optimize an objective (e.g., identify customer(s) likely to upgrade services during an upsell, etc.). Deep learning is a form of machine learning that utilizes a neural network to transform a set of inputs into a set of outputs via an artificial neural network. Reinforcement learning is a process in which an agent learns to make decisions through trial and error. This problem may be modeled mathematically as a Markov decision process, where an agent at every timestamp is in a state s, takes action a, receives a scalar reward and transitions to the next state s' according to environment dynamics $p(s's,a)$. The agent attempts to learn a policy, or map from observations to actions, in order to maximize its returns (expected sum of returns). As a simple example, a reinforcement learning algorithm could be trained to identify customers who are very likely to answer a phone call from a call center as part of an outbound call campaign, wherein the environment dynamics are whether a predicted customer actually answered a dialed phone call which can be used to reinforce the predictions of the RL algorithm.

According to an embodiment, the deep RL network is configured wherein the nodes of the deep neural network represent features of a customer taken directly from the customer profile which comprises a plurality of data fields containing various types of data that is used to describe a given customer. Features may be drawn from the non-limiting list of: demographics, subscriptions and/or services, historical interactions (e.g., type of interaction, interaction outcome, metadata associated with interaction, etc.), campaign details, social media information, web app information and metadata, mobile app information and metadata, and propensity prediction data (e.g., P2P, P2C, BTTC, etc.), and predicted values and actual values. Over time with training and by processing large datasets, the deep RL network learns the connections between the feature nodes and how these connections impact the network output. It is in these hidden layers, as they are referred to in the art, in which the advantage of a deep RL network is realized in that the algorithm is able to learn and relearn these hidden connections between such a large amount of data points in order to answer advanced queries, to make predictions which can be leveraged to improve business outcomes, or to reconfigure business technology, based upon the desired use case and the reward selected during algorithm training configuration.

One of the key features of using deep learning tools in reinforcement learning is generalization: the ability to operate correctly on previously unseen inputs. Since deep RL allows raw data, there is a reduced need to predefine the environment, allowing the model to be generalized to multiple applications. With this layer of abstraction, the deep reinforcement learning algorithm can be designed in a way that allows it to be general and the same model can be used for different tasks. Consider that call campaigns may be created for various purposes such as customer retention, sales, collections, surveys, and support. Or consider that call campaigns may be created to engage with a specific demographic bound by a geographic location or by specific rules and regulations. These are just a few simple examples chosen to represent only a small portion of a plurality of reasons for identifying a specific customer or group of customers which can exist when creating a customer records list for a call campaign, and to highlight how useful a generalizable deep RL model is to support the various predictions that can be generated by simply optimizing the general deep RL model about a specific feature, set of features, or feature space.

Neural networks are a family of learning algorithms that use a "network" consisting of multiple layers of interconnected nodes. Inspired by the animal nervous system, where nodes are viewed as neurons and edges are viewed as synapses. Each edge has an associated weight, and the network defines computational rules for passing input data from the network's input layer to the output layer. A network function associated with the neural network characterizes the relationship between input and output layers, which is parameterized by the weights. With appropriately defined network functions, various learning tasks can be performed by minimizing a cost function over the network function (e.g., weights). Common algorithms that may be used to perform such minimization functions can include stochastic gradient descent and regression analysis.

According to an embodiment, parametric optimizer 415 may be configured to perform machine learning algorithm maintenance and optimization as part of the feedback loop during the training stage 410. Parametric optimizer 415 may be an autonomous, or semi-autonomous component wherein a human operator, such as a data scientist or software engineer, can perform some manual tuning of the algorithm parameters. Parameter and hyperparameters such as edge weights, biases, learning rate, batch size, number of epochs, and cost function variables may all need to be updated during each round of algorithm training based upon the training output 414. Parametric optimizer 415 may also perform model pruning, wherein inactive or low usage neurons and their associated edges are pruned from the neural network. Such pruning tasks can reduce network processing latency as well as reduce the size of the model thus saving storage space and processing power. Once feedback data has been applied and the one or more machine learning algorithm 413 has been updated, it may be used in another iteration of training with new training data 412. This process may repeat itself until a desired model performance is achieved (e.g., prediction score of 95% reliably output by algorithm, the cost function has been minimized, etc.). According to some embodiments, the training process may be an ongoing process that is performed when new data is ingested into system 100. According to some embodiments, the training process may be scheduled to perform at various time intervals.

Once the one or more machine learning algorithms 415 have been successfully trained and configured, a trained model 422 may be sent to a deployment stage 420 wherein the trained model 422 can process real input data 421 and generate live, actionable predictions as model outputs 423, which can be used to provide adaptive campaign management solutions and services to a plurality of enterprises. Model outputs 423 may be used as feedback data in the training stage 410, thereby enabling analytics module 400 to continuously train and adapt its one or more machine learning algorithms. Additionally, model outputs 423 may be applied to customer profiles and stored in unified customer database 113 or sent 430 to other system components, such as CCM 140, which can use the model outputs to create a call list for a call campaign. Trained model 422 may be periodically updated with a model developed in the training stage 413. According to some embodiments, at the training stage 410 a trained model 422 and a model in training (that is two models with similar, but slightly different parameters) may be simultaneously tested on a the same training data and the results from each model compared against each other in order to determine which model produces more accurate outputs, and the model that wins the comparison may be used in the next stage of model testing and the model that loses can be discarded. Such a comparison process is another way in which deployed models can be compared against models still in training without disrupting the production or deployment environment.

As a simple example, if a machine learning algorithm is being trained to predict a probability that a customer will answer a phone call during a certain time of day, then training data could consist of a customer record, enterprise specific data, historical customer interactions, campaign results, historical campaign call lists, customer social media data, customer mobile device data, PPO platform predictions, and a plurality of other types of customer and/or enterprise related data, and the algorithm would use these inputs to produce training output. Continuing the example, the training output, which in this exemplary case is a prediction of whether a customer will answer a phone call, may be compared against historic campaign results data which indicate the outcome of a phone call for each customer (e.g., number) on a campaign call list. A score may be assigned to the training output based on the comparison to historic results data, wherein the score is higher if the training output 414 predictions matched the true results of the call campaign, and a lower score is assigned if the training output 415 predictions did not match the true results. This score may be used as part of the feedback loop in the reinforcement learning aspect of the deep RL model, thereby representing the reward that the RL model must maximize in order to achieve optimal results.

Figure 5:
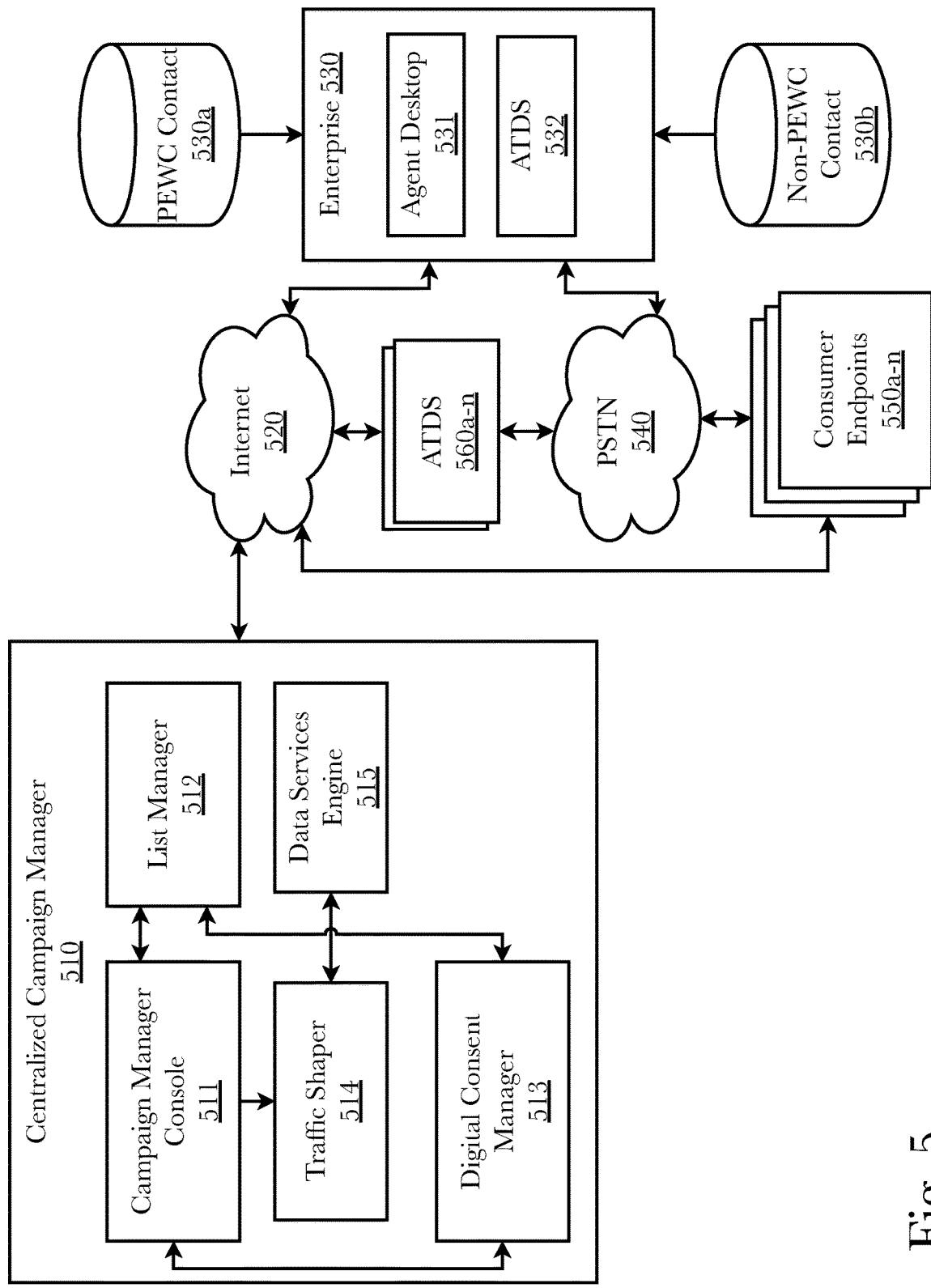
FIG. 5 is a block diagram illustrating an exemplary architecture for an advanced consent management system utilizing multiple outbound channels, according to an embodiment.

FIG. 5 is a block diagram illustrating an exemplary architecture for an advanced consent management system utilizing multiple outbound channels, according to an embodiment. According to the embodiment, advanced consent management system 500 comprises a centralized campaign manager (CCM) 510 configured to connect with an enterprise 530, such as a contact center, and a plurality of consumer endpoints 550a-n via a communication network such as the Internet 520. The system 500 may further comprise a plurality of automatic telephone dialing systems (ATDS) which may be cloud-based ATDS 560a-n or on-premise ATDS 532 located at an enterprise 530, for example a contact center's local auto-dialer system. Each of these ATDS 560a-n, 532 can connect with a public switched telephone network (PSTN) 540 to perform automated dialing campaigns as managed by CCM 510.

According to the embodiment, CCM 510 is configured to autonomously manage outbound call campaigns for an enterprise 530 utilizing multiple dialers 560a-n, 532 while performing advanced consent management by integrating with a plurality of digital channels configured to obtain consent from a customer prior to a telephone call being placed to the customer. This embodiment of CCM 510 represents a "digital plus dialer" system which means obtaining consumer consent is initiated in a non-telephony channel, but the actual dialing for a outbound call campaign is conducted using a more conventional telephonic channel (e.g., PSTN, VoIP, etc.).

According to the embodiment, CCM 510 may comprise a campaign manager console (CMC) 511, a list manager 512, a traffic shaper 514, a data services engine 515, and a digital consent manager 513. CMC 511 may constitute a software application or applications running on a single server, a plurality of servers, or in a third party cloud service, that may connect with users either physically at a terminal or across a network connection. Such a network connection may be a Local Area Connection ("LAN") or a Wide Area Connection ("WAN") such as the Internet 520, and may use any of a variety of protocols including SSH, Telnet, TCP/IP, UDP, and others. Campaign manager console 511 may be configured to be a central access point for users and administrators to access other parts of centralized campaign manager 510, such as digital consent manager 513 or traffic shaper 514, and may provide functionality for an administrator to create and manage a customer contact and autodialing campaign, including campaign duration, digital channel selection, digital channel message selection, scope, customer records to contact, agent distribution and reservation settings, and agent integration with the system.

Agent desktop software 531 may take the form of software operating on a virtual or physical desktop managed by CCM 510 that an agent uses to set their own information such as availability and reservation status, and interact with received customer records, which may be received either directly from a CMC 511 or from data services 515 that determine which agents to send which records after a traffic shaper 514 determines how to organize the traffic from customer records to agents. A traffic shaper 514 may be a separate component to a CMC 511, or may be software that operates as part of the CMC 511, and determines based on the specifications of the campaign from the CMC 511 when enough customer records of PEWC or non-PEWC status are available to start reserving and interacting with agents, and sends the records to a data services engine 515, potentially with data about which agents or section of agents may be preferred for which customer records or sections of customer records. Alternatively, the data services engine 515 may make this determination about which agents are relegated to which customer records. An administrator may be a member or representative of an enterprise 530, an enterprise being a user of the centralized campaign manager 510 to operate a customer contact campaign using the CMC 511 over a network such as the Internet 520. The enterprise 530 must upload in some format, a list of customer records, comprising either or both of PEWC and non-PEWC customer records 530a, 530b, either as separate lists or in one single combined list, though they must be marked or recorded as being PEWC or non-PEWC customer records if they are in a mingled list. The format of such a list may be raw text, a spreadsheet document, a .csv, a database table, direct connection to a database, or some other format for sharing data that may be common in the art. CCM 510 may direct, at some point during its operation, one or more ATDS 560a-n, 532 and/or agent desktop 531 to dial out to customers 550a-n, using a PTSN 540, using methods described herein.

According to an embodiment, a digital consent manager 513 may be present as a component of centralized campaign manager 510 and configured to store, manage, and obtain consumer consent by using one or more integrated digital channels and/or digital mechanisms. In some embodiments, the digital channel is facilitated using a software application (e.g., consent app 450, see FIG. 4 below for more details) stored and operated on a consumer device 550a-n, wherein the software application comprises services and mechanisms for interacting with CCM 510 in order to provide consent via an electronic means. Consent data that is obtained via one or more digital channels may be sent to list manager 512 which can update customer records with updated consent status, and store the updated consent records in a consent database, such as PEWC contact database 530a. Furthermore, digital consent manager 513 can be configured to obtain consumer consent for calls and then instruct an auto-dialer (e.g., ATDS 560a-n, 532) to place a telephone call to the number associated with consumer who provides consent via one or more digital channels.

According to the embodiment, list manager 512 is configured to manage the formation, storage, retrieval, and maintenance of lists of customer records that are uploaded into campaigns. Lists may be uploaded by enterprise 530. Lists may also be discovered and retrieved from 3rd party sources such as from the National Do Not Call Registry list. According to an aspect, a list may comprise a plurality of records, wherein each record in a list is a number to be dialed along with parameters specific to that number. Examples of parameters can include, but are not limited to, a priority parameter which indicates in what order the stored number should be dialed, a time-to-call and/or time-not-to-call parameter, a consent status which indicates the current call consent status associated with the stored number, digital channel connections (e.g., existing and historical available digital consent channels, etc.), and account data associated with the stored number such as, for example, an account balance may be used to sort a collections campaign by grouping available numbers within a time slot by how much they owe. These, and other parameters, may be used by list manager 512 or other CCM 510 components in order to search, filter, group, or otherwise interact with records stored in a given list. Additionally, list manager 512 may filter a list of records according to parameters specific to a calling campaign and then create a new list comprising the filtered records to be used in the calling campaign. For example, an enterprise 530, such as a video streaming service, may choose to create a "consumer retention campaign" via CMC 511 by indicating during campaign configuration that customers whose subscription to the video streaming service is set to expire in the next two months should be called, and list manager 512 can use this two month campaign parameter to search through existing enterprise customer list to find account data which indicate their subscription expires within the next two months, filter out all customers who do not fit within the campaign parameter, and create a new list comprising only customers who's subscription is set to expire within the next two months. As another example, a sub-list may be filtered to comprise records that all have a specified time-to-call parameter which fall within a given time period (e.g., thirty minute time period, etc.). Any list may be created using this filtering method applied to any data field associated with the records in a list (e.g., create a list of numbers with same area code, create a list of numbers with PEWC status and list with Non-PEWC status, etc.).

According to the embodiment, list manager 512 is configured to provide list management functions and features for outbound call campaigns. One such list management feature may be adding numbers to lists based upon need/opportunity detection. An event may happen within the software application stored and operating on the consumer device 5501a-n that causes the app to add the user of the consumer device to a campaign or to a particular list. For example, the app may provide a customer support portal and an event may be a customer creating a ticket with customer support via the portal on the app. In this case, when a customer creates a ticket the list manager 512 can receive this information and add the customer's number to a campaign. In some embodiments, a mobile device user's response to a message received over a digital channel may be an event that list manager 512 can recognize and respond to. Another example of a list management feature may be removing numbers from lists. For example, if customer or enterprise need has been fulfilled using a digital channel, then list manager 512 can eliminate an unneeded call. As another example, a number may be removed from one list and added to another list (that may be associated with a different campaign) in order to convert it to an upsell call.

Another list management feature that may be present in centralized campaign manager system 510 is the ability to change and update parameters associated with numbers and/or customer records in lists. For example, customer record parameters that indicate when an appropriate time to call or when not to call may be learned and/or changed in digital channels directly from the consumer and/or including from patterns of app usage. For example, if a customer is most active on the software application stored and operated on the customer's mobile device in the evening between 6 p.m. and 8 p.m., then list manager 512 may be able to detect this usage pattern and adjust a call time parameter associated with the customer's record in the list. Another example of a type of parameter change that list manager can facilitate is adjusting prioritization of numbers in lists based on events in the digital channel. For example, some event on the app and/or within one of the digital channels causes the customer's propensity to churn to change substantially, which results in increasing (or decreasing) the prioritization number parameter. These are just a few simple examples of parameter adjustment that can be performed by list manager, and are not intended to be at all limiting in their scope or definition. Any existing parameter associated with a number in a list may be adjusted, if required, and adjustments may be based on events and activity in the digital channel and/or mobile device app, or from data otherwise implied, derived, or otherwise inferred from data related to the events and activity.

This digital plus dialer advanced consent management system can be configured to support multichannel outbound calling and interactions with a consumer or consumers. One particular use case may be when an enterprise agent has made a telephone call to a non-PEWC number, the customer can receive, while one the phone with the enterprise agent, a message via the customer's mobile device software application (e.g., consent app, referring to FIG. 4) and the customer can authenticate (e.g., provide consent) via the app or text message (or any other digital channel that can be established between CCM 510 and the consumer device 550a-n. The CCM 510 can send a digital message via a digital channel that dictates what will be done on the audio channel (i.e., telephone call). Another exemplary use case of multichannel outbound calling and interactions is the use a multiple dialers to serve one campaign, and/or the use of multiple dialers to support one or more campaigns. The use of multiple dialers to server one campaign may include using a dialer configured to make calls to numbers associated with PEWC records, while a separate, specifically configured simple dialer is used to make calls to engage with non-PEWC records. In this use case, an outbound call campaign could be serviced by an enterprise 530 and its dialers 532 and by the enterprise's partners and their dialers 560a-n, and could use various ATDS within one campaign.

Figure 6:
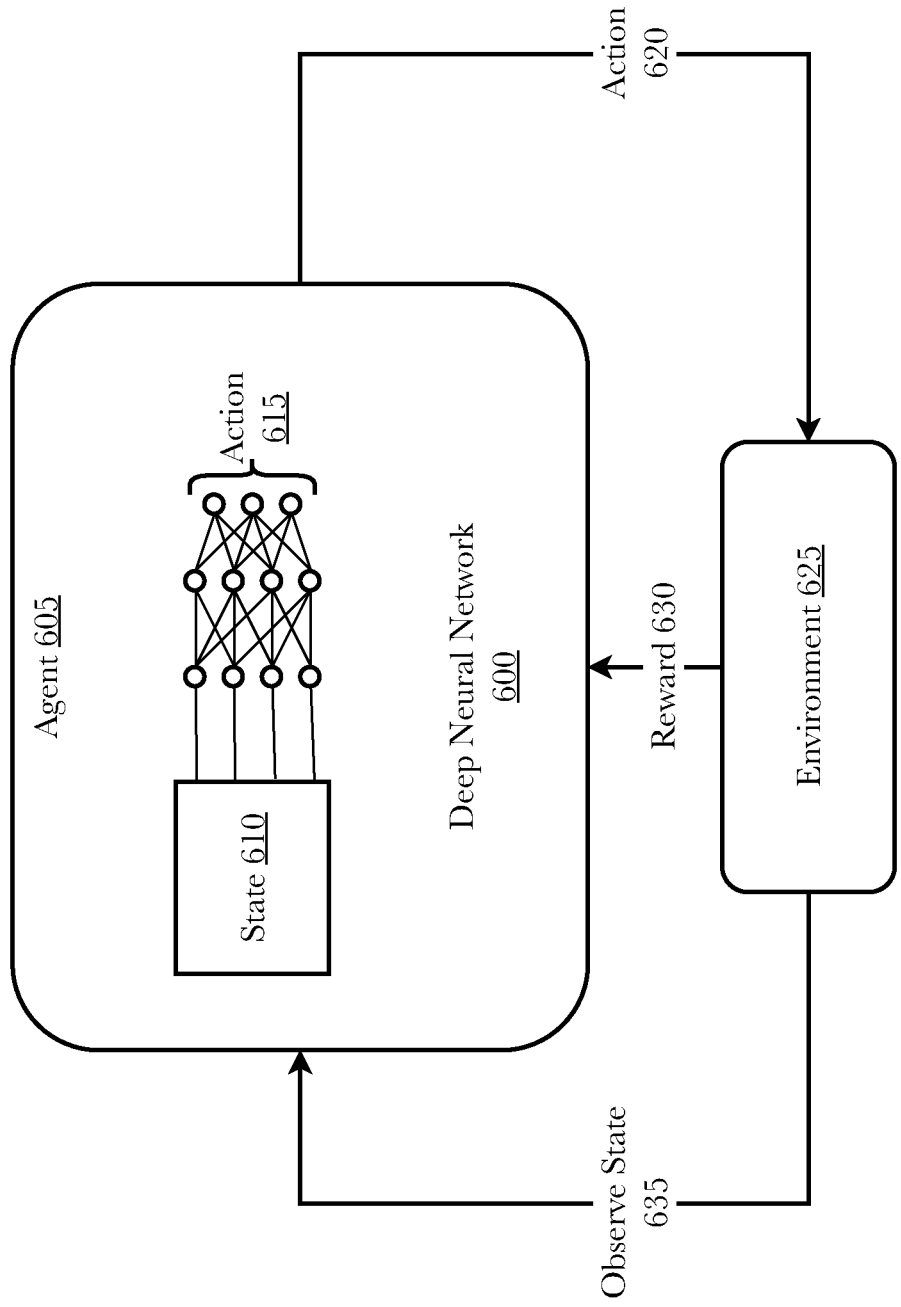
FIG. 6 is a block diagram illustrating an exemplary deep reinforcement learning neural network architecture, according to an embodiment.

FIG. 6 is a block diagram illustrating an exemplary deep reinforcement learning neural network architecture, according to an embodiment. According to the embodiment, a deep reinforcement learning (deep RL) neural network 600 may be used to make predictions related to business outcomes and customer engagement based on a large plurality of unified customer records data. In such an architecture, a computational agent 605 is tasked with learning to make decisions by trial and error. In this embodiment, the computational agent 605 is a deep neural network 600. Deep RL incorporates deep learning into the solution, allowing agent 605 to make decisions from unstructured and structured data without manual engineering of the state space. Deep RL algorithms are able to take very large inputs and decide what actions to perform to optimize and objective (e.g., maximizing customer engagement). A deep neural network 600 is utilized to transform a set of inputs into a set of outputs in the form of actions 615. The output actions 620 may be implemented in a particular environment 625 and the state of the environment can be monitored to determine the effects that action 620 had on the system/environment. In this embodiment, actions 615 may comprise predictions about customer engagement and business outcomes which an enterprise can use to enhance its business goals. This problem can be modeled as a Markov decision process, where agent 605 at every timestep is in a state 610, takes an action 615, receives a scalar reward 630 and transitions to the next state 635 according to environment 625 dynamics.

In this embodiment, the environment 625 may be a call center executing a call campaign, and the observed state 635 are the outcomes (e.g., customer answered, no answer, machine answer (voicemail), etc.) associated with a given call to a customer. The actions 617 generated by the DNN 600 may be predictions about customer engagement and the reward may be a scored calculated based on the customer engagement predictions compared against the actual call outcomes, wherein a higher score correlates to customer engagement predictions that resulted in a call outcome in which the customer answered the phone. Likewise, a lower score may correlate to customer engagement predictions that did not result in a answered phone call. These are just simple examples of how a reward 630 may be calculated and applied to the agent 605. The agent 605 uses these rewards as feedback to gauge how accurate the model is behaving in regards to the desired actions 615 (i.e., customer engagement predictions).

In other embodiments, the environment 625 may be a virtual environment which simulates call center operations and call campaigns. In such an embodiment, actions 615 may be applied to the virtual or simulated environment and the environment's observed state based on the actions may be used in the next round of trial and error.

Each state 610 that led to an action or actions may be saved and stored for auditing purposes. Another use case of storing the state 610 associated with an action 615 is that it can allow for adaptive campaign management system 100 to correlate states with outcomes, which can be used to generalize outcomes for newly encountered, but similar in state to stored states, environments. This may allow system 100 to make inferences on new environments or even on new datasets based on state observations and can decrease the amount of time to train a new deep RL algorithm.

Detailed Description of Exemplary Aspects

Figure 7:
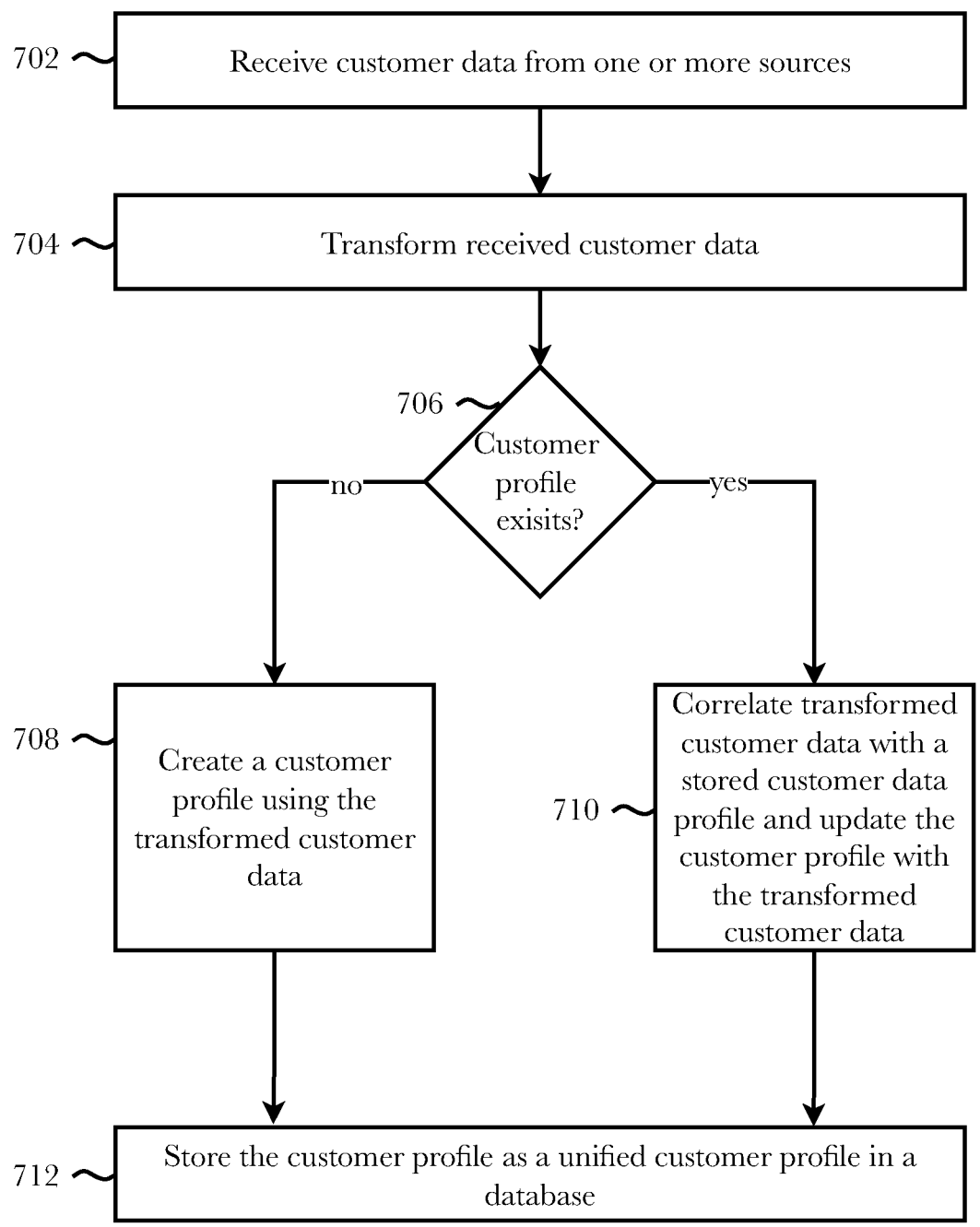
FIG. 7 is a flow diagram illustrating an exemplary method for ingesting, transforming, and correlating customer data, according to an aspect.

FIG. 7 is a flow diagram illustrating an exemplary method for ingesting, transforming, and correlating customer data, according to an aspect. The process begins at step 702 when customer data platform 110 receives, retrieves, or otherwise obtains a plurality of customer data from one or more sources. For example, one source of customer data may come from an enterprise, such as a cable television service provider, and a second source may be another separate enterprise, such as a cell phone carrier. Each of these two or more sources may have customer data profiles already stored in an enterprise specific database which can be accessed by customer data platform 110 using various mechanisms such as an API framework which queries enterprise databases for customer data. In some embodiments, an enterprise may be able to directly upload customer data and/or campaign details to either customer data platform 110 or via centralized campaign management system 140. No matter the provenance of the data, or the method of data ingestion, all obtained data proceeds to step 704 where it may be sent to an appropriate data processing pipeline for data cleansing and data transformation tasks. Data received at and stored in customer data platform 110 may be transformed or mapped to a standard data format. In some embodiments, the standard data format may be a JSON format for structured data that is obtained. Unstructured data may not be transformed or mapped, but stored in its raw form in a suitable data storage system such as, for example, a No-SQL database. Once the obtained customer data has been transformed, the process continues to step 706 which checks the unified customer database 113 to identify if a customer data profile associated with the ingested and transformed customer data already exists and is stored in the database. If a customer data profile associated with the received customer data already exists, then customer data platform 110 correlates the transformed customer data with the stored customer data profile and updates the customer profile with the transformed customer data at step 710. The process of correlating the new customer data with the existing customer data may involve tasks such as, for example, checking existing data fields for stored data and then updating the data fields with the new data if necessary, and creating and populating new data fields with the new data. After the new data has been successfully correlated with an existing customer data profile, the updated customer data profile, at the next step 712 is stored as a unified customer profile in a database, such as unified customer database 113. The customer data profile is considered unified because it brings disparate customer data from one or more sources (e.g., enterprises, social media, interaction history, campaign details, etc.) together into a single profile that may be accessed and shared by a large plurality of enterprises in order to streamline business processes and improve business outcomes by applying machine learning methods to generate customer engagement predictions for a customer or group of customers.

If instead, at step 706 there is no prior existing customer profile, then the process continues to step 708 wherein a new customer profile is created using the ingested and transformed customer data. In this case, the created customer profile will have its data fields populated with the transformed customer data thereby enabling the creation of customer profile. Upon successful creation of a new customer profile, it may be stored 712 as a unified customer profile in a data, such as a unified customer database 113.

Figure 8:
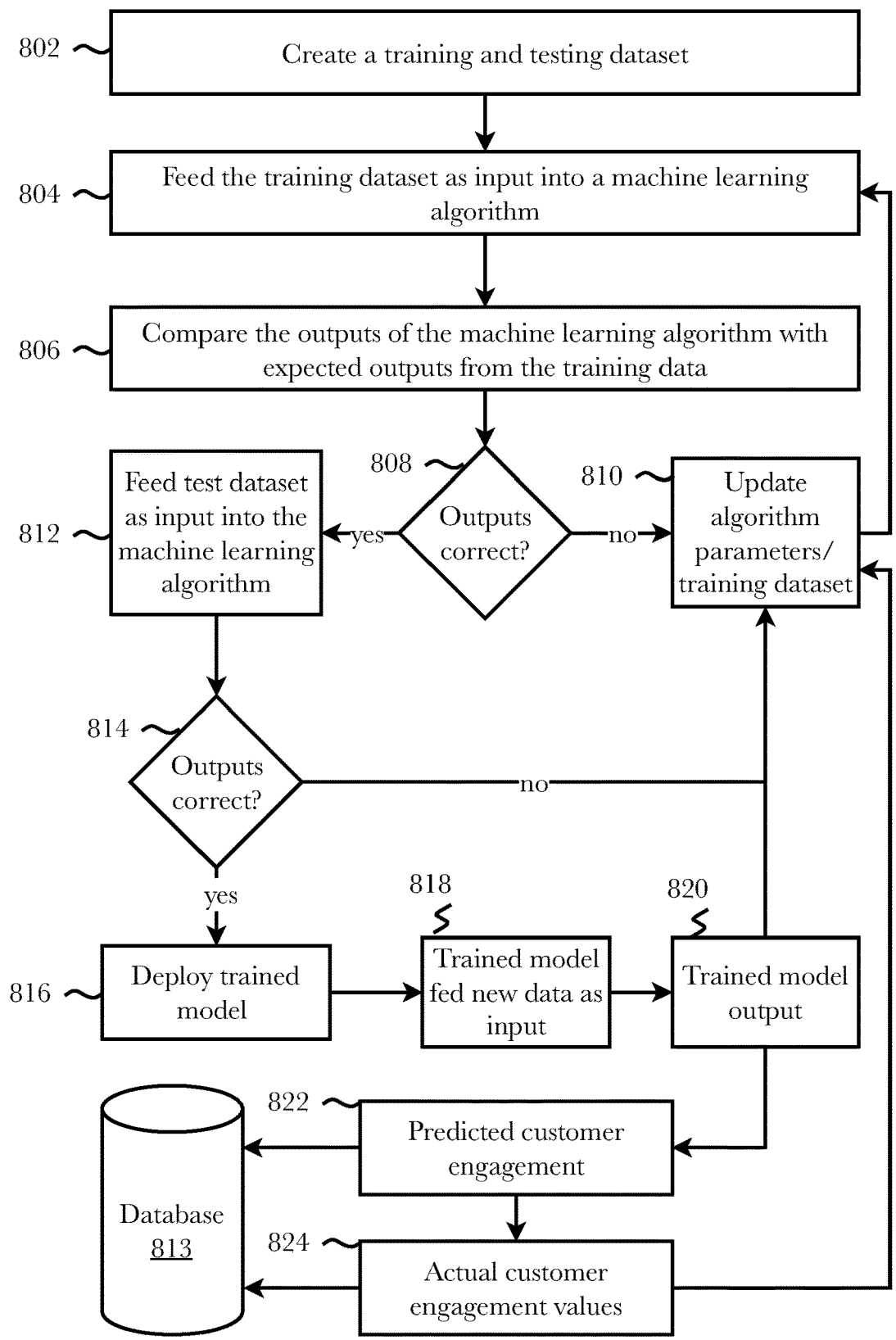
FIG. 8 is a flow diagram illustrating an exemplary method training and deploying one or more machine learning algorithms, according to an aspect.

FIG. 8 is a flow diagram illustrating an exemplary method training and deploying one or more machine learning algorithms, according to an aspect. According to the aspect, the process begins at step 802 when dataset creator 411 retrieves a plurality of stored data and segregates the retrieved data into a training dataset and a test dataset. The retrieved data may include, but is not limited to, stored customer profile data, social media data, campaign details, historical transaction data, and models outputs from PPO platform 130 (e.g., P2P, P2C, BTTC, etc.). This information, as well as other information, may be used to create a training dataset and/or test dataset. The training dataset may then be fed as input into one or more machine learning algorithms at step 804. In a preferred embodiment, the machine learning algorithm is a deep neural network configured to make customer engagement predictions based on input data. In an embodiment, the deep learning neural network is a deep reinforcement learning (RL) neural network. According to the embodiment, the deep RL network is a general network that is configured to make customer engagement predictions. One of the benefits of using a deep RL network is that a generalizable neural network can be trained to for a specific prediction task based on what the reward for the reinforcement learning portion of the network is selected as. For example, the reward that may be used to train the deep RL network may be to maximize customer engagement via a telephone call, to support an outbound call campaign for an enterprise. As another example, the reward may be earned by training the network to maximize customer retention for an enterprise. A non-limiting list of exemplary rewards that can be used to configure a general deep RL network for a specific prediction task may include, customer retention, customer engagement (e.g., via telephone call, text or email, instant messaging, social media post, blockchain smart contract, web application, mobile phone application, etc.), upselling a customer, customer referrals, customer churn, customer payments, and various other actions and tasks that may be pertinent to an enterprise and/or contact center.

In some embodiments, PPO platform 130 may train a deep RL network to make predictions about the effectiveness of sending a reminder (e.g., alert, notification, message, call, email, etc.) at a specific time relative to another specified time. Such a model may be trained using historical and available real-time data associated with a customer's profile and current status (e.g., customer interactions with enterprise systems), as well as historical information associated with past sent reminders and the customer engagement directly affected by such reminders. For instance, such a model provide the ability to predict the probability of whether a reminder would help receive a payment from the customer. Additionally, such a model could predict whether the reminder should be sent before a due date, on the due date, or post due date to help payment by a customer, and predict the probability of payment for a given date before or after the payment due date and the portion. In various implementations, the specified date may be associated with a payment due date, a scheduled call date, a product delivery date, etc. Predictions associated with sending reminders may be sent to analytics module 112 and fed into a deep RL network as an input to generate a predicted probability of engagement for the customer associated with the retrieved unified customer data profile.

After the training data has been used as input to train the machine learning algorithm, the next step 806 is to compare the algorithm outputs with expected outputs form the training data. For example, if the output from the algorithm is a predicted customer engagement for a phone call, then the predicted output can be compared against historical call outcome data which is included as part of the training dataset. As another example, if the predicted output from the algorithm is a predicted customer upsell probability, then the predicted output can be compared against historical customer upsell data which is part of the customer profile data included in the training dataset. At step 808, if the outputs as compared against actual historical values are not correct (e.g., exceed a predetermined threshold for accuracy, error function of machine learning algorithm is minimized, etc.), then the process flows to step 810 wherein the algorithm parameters, hyperparameters, and/or training datasets may all be updated and applied to the next round of training at step 804. This process may be repeated as necessary until the desired results at step 808 are satisfied.

If at step 808, the outputs from the algorithm in training are correct, then the process continues to step 812 wherein the test dataset is fed as input into the machine learning algorithm. The test dataset is drawn from the same group of data as the training dataset, but provides a new dataset which the algorithm has not processed before. The use of a test dataset allows for another round of testing and feedback to be applied to an algorithm in training before it is deployed to a production environment. At step 814 the outputs from the algorithm that was fed the test dataset is compared against the expected outputs from the test dataset. If the algorithm outputs are not correct, or do not meet the requirements for successful training, then the process proceeds to step 810 wherein the algorithm can be updated and another round of training can be conducted. If instead, however, the outputs of step 814 are correct, then the machine learning algorithm has become a successfully trained model which can be deployed 816 into a production environment wherein it can be fed new data as input 818 in order to generate actionable outputs at step 820. The trained model may be fed new input such as, for example, a customer profile or group of customer profiles, and 822 make predictions about customer engagement, or any of the other uses cases the general deep RL network may be specifically configured to account for via the selection of the reward for the reinforcement learning aspect of the network. The trained model outputs may be associated with a customer profile and stored in a database, such as unified customer database 113. Likewise, the actual customer engagement values 824 may also be associated with a customer and stored in unified customer database 813. Additionally, the predicted values and the actual values may be used at step 810 to update and train the machine learning model in the training stage. In this way, the trained model and one or more machine learning algorithms that support it can be continuously learning and updating as new data is received and based off of output values in relation to the actual values associated with a model prediction.

For example, even though a customer made a payment or subscription renewal, it might be treated as a success, but the customer might have asked for a discount and an agent (e.g., contact center agent) might not have handled it well which makes the customer likely to churn on the next opportunity. In this case, the customer engagement and interaction may have been logged as a positive and/or successful outcome, when in reality the business "success" was really a business failure. Or consider an example where a customer might not have responded to a dial attempt or a text (or some other form of communication that may be conducted over a digital channel) which may be logged as a negative or unsuccessful attempt at customer engagement, but if the subscription was renewed within a couple hours, it was really a success. What these two examples illustrate is that customer data platform 110 and the underlying machine learning and deep learning algorithms that drive the analytical power of the platform can connect data points across time (and interactions), and failures can be reclassified as successes and vice versa.

One of the key features of customer data platform 110 can provide is the ability to unify disparate data and feed the unified data into a deep RL neural network which, over time, can learn the hidden associations between features of a customer data profile which lead to predictions that can be used for a variety of purposes. One such use case is to reconfigure various business technologies. For example, the predictions produced by the deep RL network may be used to reconfigure an auto-dialer system, such as by updating an existing call list or curating a new call list based on the predictions and other business factors.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the aspects disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific aspects, at least some of the features or functionalities of the various aspects disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some aspects, at least some of the features or functionalities of the various aspects disclosed herein may be implemented in one or more virtualized computing environments (e.g., network computing clouds, virtual machines hosted on one or more physical computing machines, or other appropriate virtual environments).

Figure 9:
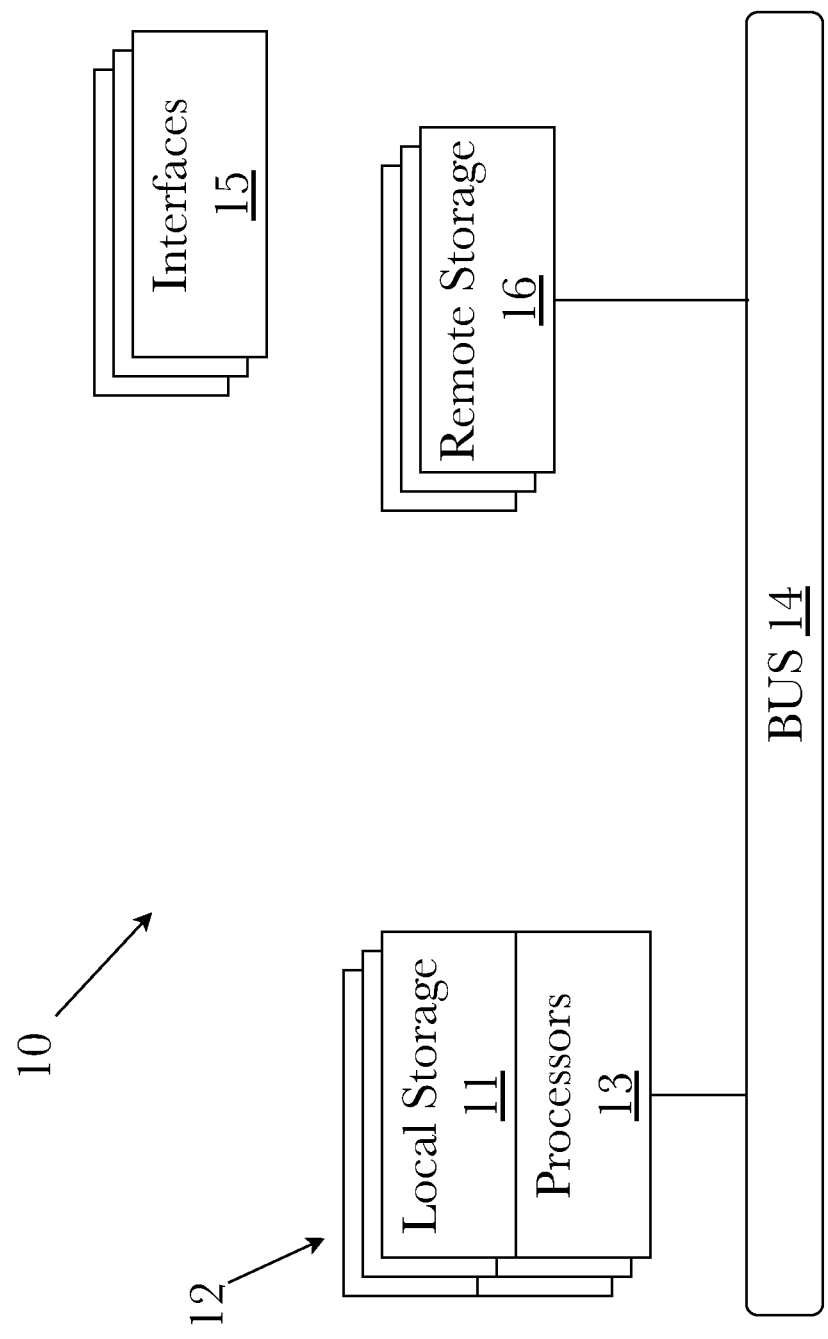
FIG. 9 is a block diagram illustrating an exemplary hardware architecture of a computing device.

Referring now to FIG. 9, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one aspect, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one aspect, a computing device 10 may be configured or designed to function as a server system utilizing CPU 12, local memory 11 and/or remote memory 16, and interface(s) 15. In at least one aspect, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some aspects, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a particular aspect, a local memory 11 (such as non-volatile random access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one aspect, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 9 illustrates one specific architecture for a computing device 10 for implementing one or more of the aspects described herein, it is by no means the only device architecture on which at least a portion of the features and techniques described herein may be implemented. For example, architectures having one or any number of processors 13 may be used, and such processors 13 may be present in a single device or distributed among any number of devices. In one aspect, a single processor 13 handles communications as well as routing computations, while in other aspects a separate dedicated communications processor may be provided. In various aspects, different types of features or functionalities may be implemented in a system according to the aspect that includes a client device (such as a tablet device or smartphone running client software) and server systems (such as a server system described in more detail below).

Regardless of network device configuration, the system of an aspect may employ one or more memories or memory modules (such as, for example, remote memory block 16 and local memory 11) configured to store data, program instructions for the general-purpose network operations, or other information relating to the functionality of the aspects described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device aspects may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 10:
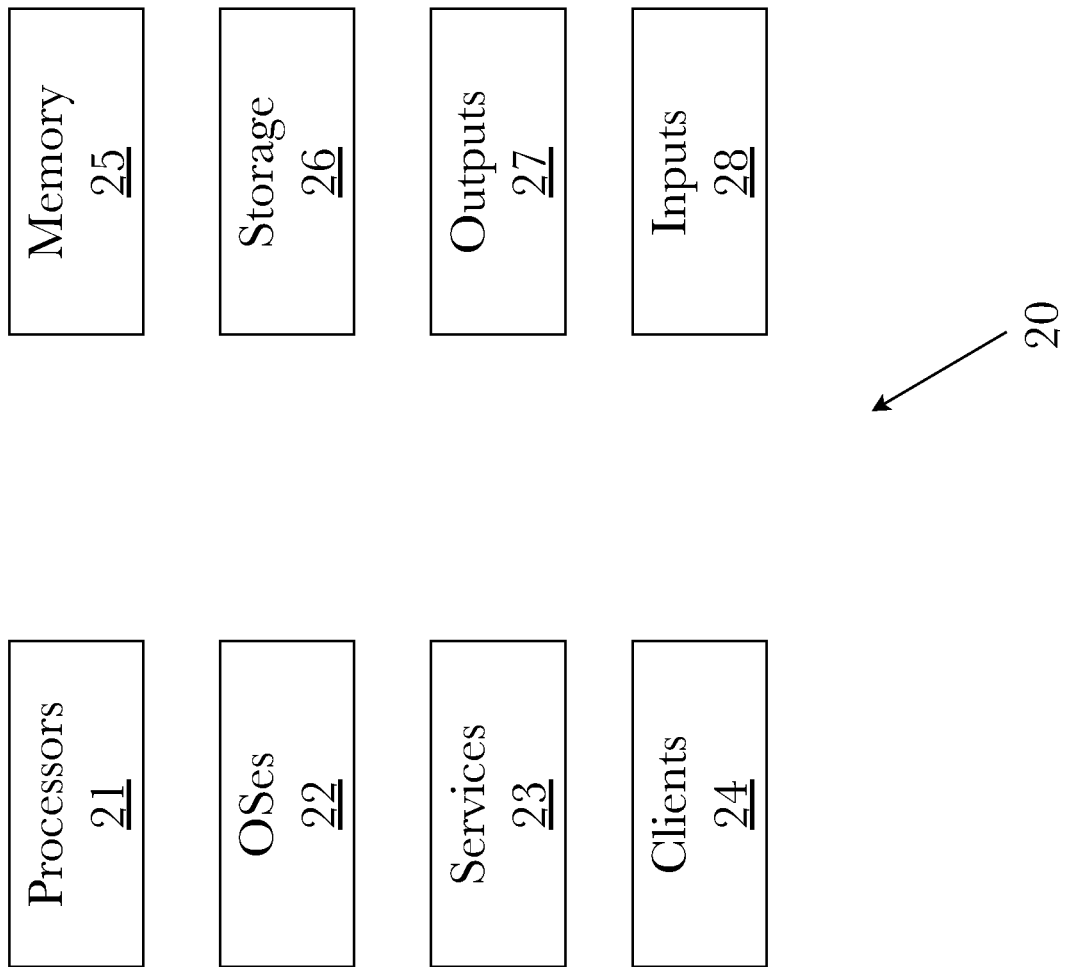
FIG. 10 is a block diagram illustrating an exemplary logical architecture for a client device.

In some aspects, systems may be implemented on a standalone computing system. Referring now to FIG. 10, there is shown a block diagram depicting a typical exemplary architecture of one or more aspects or components thereof on a standalone computing system. Computing device 20 includes processors 21 that may run software that carry out one or more functions or applications of aspects, such as for example a client application 24. Processors 21 may carry out computing instructions under control of an operating system 22 such as, for example, a version of MICROSOFT WINDOWS™ operating system, APPLE macOS™ or iOS™ operating systems, some variety of the Linux operating system, ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 9). Examples of storage devices 26 include flash memory, magnetic hard drive, CD-ROM, and/or the like.

Figure 11:
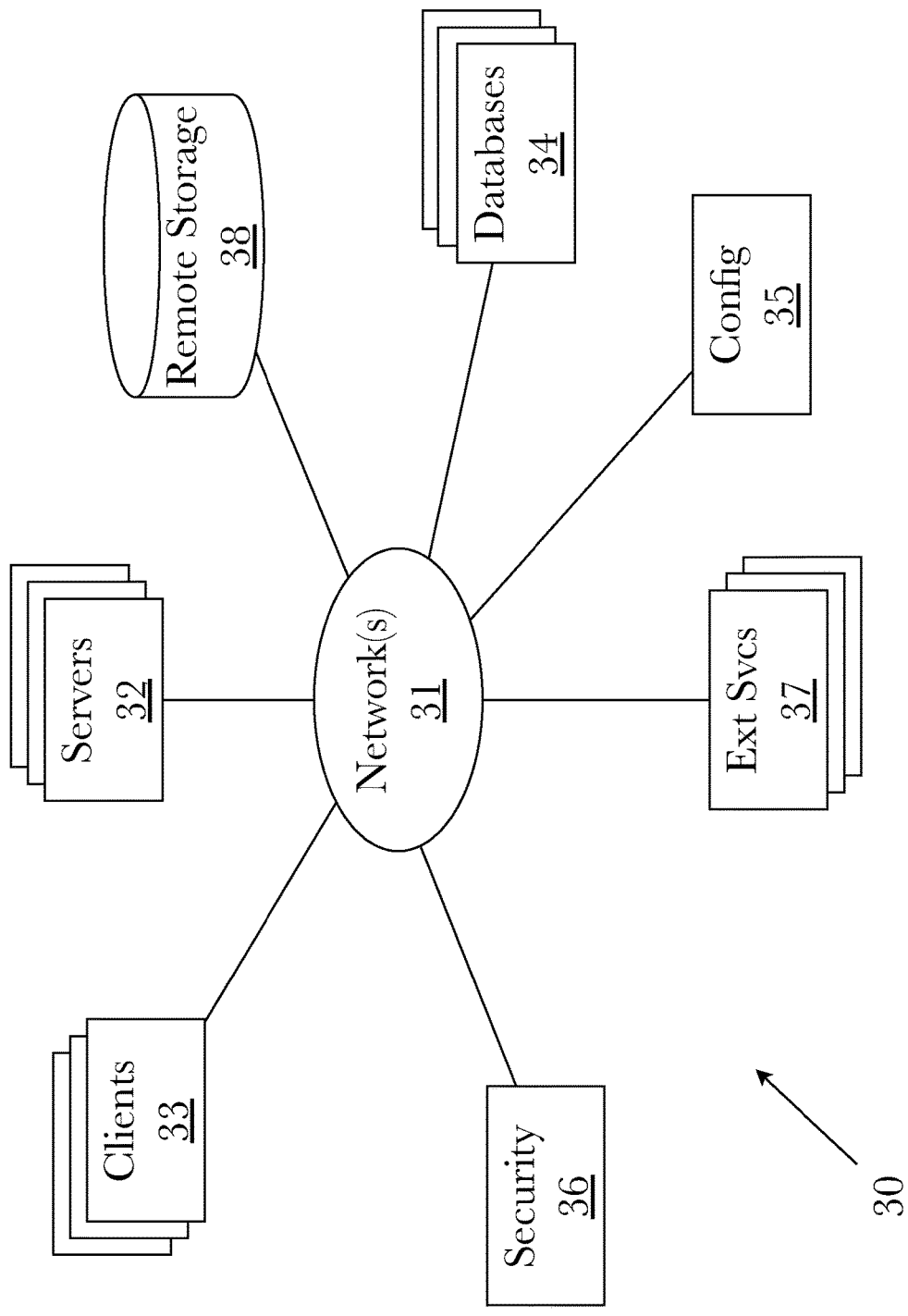
FIG. 11 is a block diagram showing an exemplary architectural arrangement of clients, servers, and external services.

In some aspects, systems may be implemented on a distributed computing network, such as one having any number of clients and/or servers. Referring now to FIG. 11, there is shown a block diagram depicting an exemplary architecture 30 for implementing at least a portion of a system according to one aspect on a distributed computing network. According to the aspect, any number of clients 33 may be provided. Each client 33 may run software for implementing client-side portions of a system; clients may comprise a system 20 such as that illustrated in FIG. 10. In addition, any number of servers 32 may be provided for handling requests received from one or more clients 33. Clients 33 and servers 32 may communicate with one another via one or more electronic networks 31, which may be in various aspects any of the Internet, a wide area network, a mobile telephony network (such as CDMA or GSM cellular networks), a wireless network (such as WiFi, WiMAX, LTE, and so forth), or a local area network (or indeed any network topology known in the art; the aspect does not prefer any one network topology over any other). Networks 31 may be implemented using any known network protocols, including for example wired and/or wireless protocols.

In addition, in some aspects, servers 32 may call external services 37 when needed to obtain additional information, or to refer to additional data concerning a particular call. Communications with external services 37 may take place, for example, via one or more networks 31. In various aspects, external services 37 may comprise web-enabled services or functionality related to or installed on the hardware device itself. For example, in one aspect where client applications 24 are implemented on a smartphone or other electronic device, client applications 24 may obtain information stored in a server system 32 in the cloud or on an external service 37 deployed on one or more of a particular enterprise's or user's premises. In addition to local storage on servers 32, remote storage 38 may be accessible through the network(s) 31.

In some aspects, clients 33 or servers 32 (or both) may make use of one or more specialized services or appliances that may be deployed locally or remotely across one or more networks 31. For example, one or more databases 34 in either local or remote storage 38 may be used or referred to by one or more aspects. It should be understood by one having ordinary skill in the art that databases in storage 34 may be arranged in a wide variety of architectures and using a wide variety of data access and manipulation means. For example, in various aspects one or more databases in storage 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some aspects, variant database architectures such as column-oriented databases, in-memory databases, clustered databases, distributed databases, or even flat file data repositories may be used according to the aspect. It will be appreciated by one having ordinary skill in the art that any combination of known or future database technologies may be used as appropriate, unless a specific database technology or a specific arrangement of components is specified for a particular aspect described herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, some aspects may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with aspects without limitation, unless a specific security 36 or configuration system 35 or approach is specifically required by the description of any specific aspect.

Figure 12:
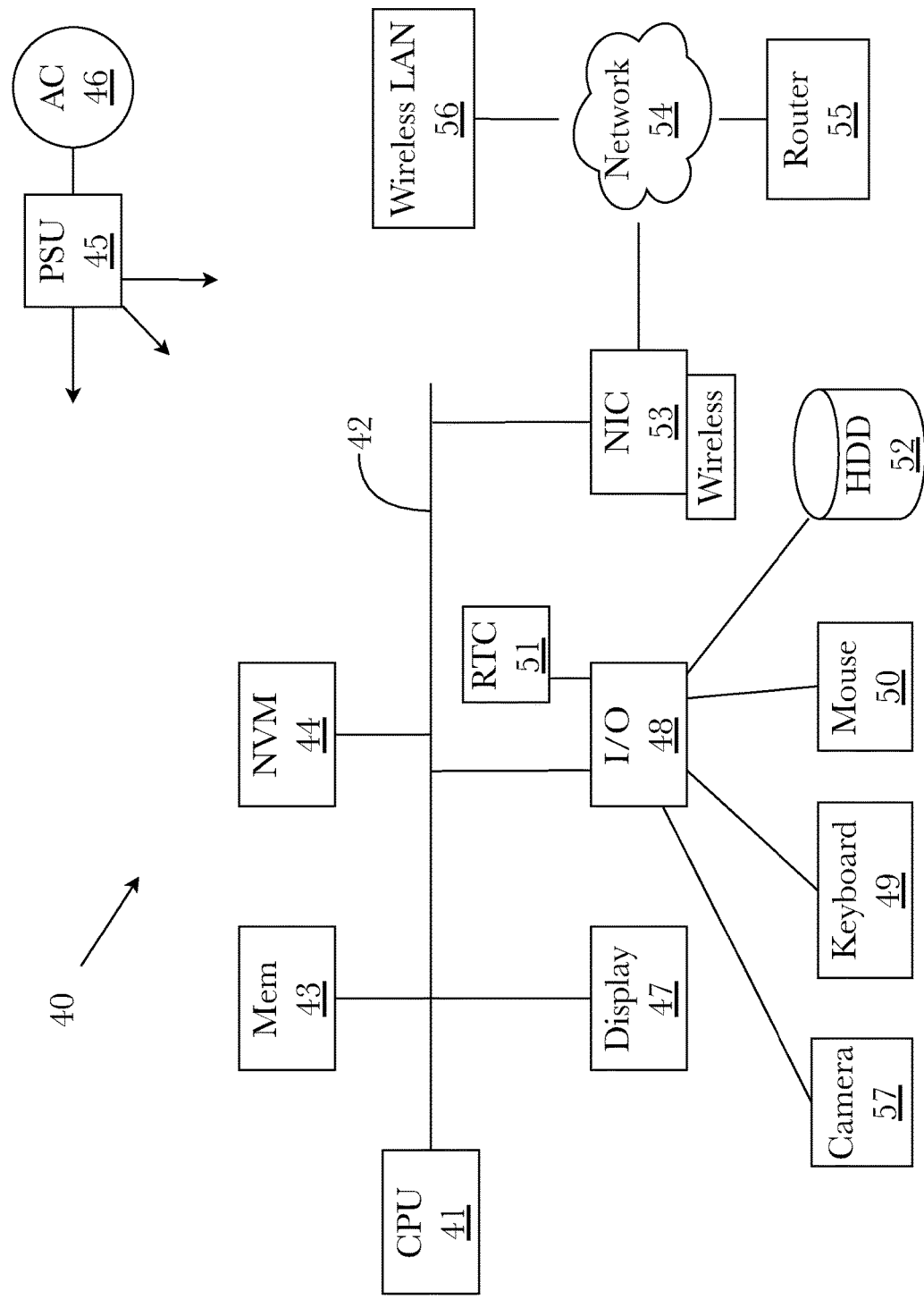
FIG. 12 is another block diagram illustrating an exemplary hardware architecture of a computing device.

FIG. 12 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to peripherals such as a keyboard 49, pointing device 50, hard disk 52, real-time clock 51, a camera 57, and other peripheral devices. NIC 53 connects to network 54, which may be the Internet or a local network, which local network may or may not have connections to the Internet. The system may be connected to other computing devices through the network via a router 55, wireless local area network 56, or any other network connection. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various aspects, functionality for implementing systems or methods of various aspects may be distributed among any number of client and/or server components. For example, various software modules may be implemented for performing various functions in connection with the system of any particular aspect, and such modules may be variously implemented to run on server and/or client components.

The skilled person will be aware of a range of possible modifications of the various aspects described above. Accordingly, the present invention is defined by the claims and their equivalents.

What is claimed is:

1. A system for adaptive digital-plus-dialer campaign management, comprising:
  a computing system comprising a processor, a memory, and a network interface;
  a data ingestion subsystem comprising a first plurality of programming instructions stored in the memory and operable on the processor which, when operating on the processor, cause the computing system to:
    ingest a plurality of information related to a customer from one or more sources;
    transform the plurality of information into a standard data format;
    correlate the transformed information with an existing customer data profile stored in a database and update the existing customer data profile with the transformed information, wherein if there is no existing customer data profile stored in the database a new customer profile is created and populated with the transformed information; and
    store the updated customer profile in the database as a unified customer profile;
  an analytics subsystem comprising a second plurality of programming instructions stored in the memory and operable on the processor which, when operating on the processor, cause the computing system to:
    retrieve a subset of customer data profiles from the database;
    segregate the subset of customer data profiles into a training dataset and a test dataset;
    use the training dataset to train a deep reinforcement learning neural network configured to predict a probability of customer engagement;
    retrieve the unified customer data profile from the database;
    receive a predicted propensity to churn associated with the customer associated with the retrieved unified customer data profile;
    receive a predicted probability to pay a bill associated with the customer associated with the retrieved unified customer data profile;
    receive a most probable block of time of each day that the customer associated with the retrieved unified customer data profile will engage in communication;
    receive a predicted most probable means of communication for each block of time for the customer associated with the retrieved unified customer data profile; and
    feed the retrieved unified customer data profile, the predicted propensity to churn, the predicted probability to pay, the most probable time of each day, and the predicted most probable means of communication as input into the trained deep reinforcement learning neural network to generate a predicted probability of engagement for the customer associated with the retrieved unified customer data profile; and
  a centralized campaign manager subsystem comprising a third plurality of programming instructions stored in the memory and operable on the processor which, when operating on the processor, cause the computing system to:

obtain a unified customer record from the database, wherein the unified customer record indicates the customer has not provided consent to receive a telephone call;

establish a connection with the customer via one or more non-telephonic channels of communication;

obtain customer consent via the one or more non-telephonic channels;

update the consent status in the unified customer record and store the updated unified customer record in the database; and where consent has been obtained, use the predicted probability of engagement for the customer associated with the retrieved unified customer data profile to generate a call time and make, using an automated telephone dialing system, an outbound telephone call to the customer at the generated call time.

2. The system of claim 1, further comprising a propensity prediction and optimization subsystem comprising a fourth plurality of programming instructions stored in the memory and operable on the processor which, when operating on the processor, cause the computing system to:

receive a plurality of customer records;

use one or more machine learning modules on the plurality of customer records to:

predict the most probable block of time of each day each customer in the plurality of customer records will engage in communication;

predict the most probable means of communication for each block of time for each customer in the plurality of customer records;

predict the propensity to churn for each customer in the plurality of customer records; and predict the probability of each customer in the plurality of customer records to pay a bill;

send the predictions to the analytics subsystem, the predictions comprising the predicted propensity to churn, the predicted probability to pay, the most probable time of each day, and the predicted most probable means of communication.

3. The system of claim 1, wherein the one or more sources comprises enterprise-specific customer records, social media, web applications, and mobile device applications.

4. The system of claim 1, wherein the standard data format is a JSON format.

5. The system of claim 1, wherein the database comprises at least a relational database.

6. The system of claim 5, wherein the database further comprises a non-relational database.

7. The system of claim 1, wherein the predicted propensity to churn, the predicted probability to pay, the most probable time of each day, and the predicted most probable means of communication are all based at least in part on real-time status data.

8. The system of claim 1, wherein the analytics subsystem is further configured to receive a predicted effectiveness of sending a reminder to the customer associated with the retrieved unified customer data profile at a specific time relative to another specific time.

9. A method for adaptive digital-plus-dialer campaign management, comprising the steps of:

using a data ingestion subsystem of a computing system comprising a processor, a memory, and a network interface:

ingesting a plurality of information related to a customer from one or more sources;

transforming the plurality of information into a standard data format;

correlating the transformed information with an existing customer data profile stored in a database and update the existing customer data profile with the transformed information, wherein if there is no existing customer data profile stored in the database a new customer profile is created and populated with the transformed information; and storing the updated customer profile in the database as a unified customer profile;

using an analytics subsystem of the computer subsystem:

retrieving a subset of customer data profiles from the database;

segregating the subset of customer data profiles into a training dataset and a test dataset;

using the training dataset to train a deep reinforcement learning neural network configured to predict a probability of customer engagement;

retrieving the unified customer data profile from the database;

receiving a predicted propensity to churn associated with the customer associated with the retrieved unified customer data profile;

receiving a predicted probability to pay a bill associated with the customer associated with the retrieved unified customer data profile;

receiving a most probable block of time of each day that the customer associated with the retrieved unified customer data profile will engage in communication;

receiving a predicted most probable means of communication for each block of time for the customer associated with the retrieved unified customer data profile; and feeding the retrieved unified customer data profile, the predicted propensity to churn, the predicted probability to pay, the most probable time of each day, and the predicted most probable means of communication as input into the trained deep reinforcement learning neural network to generate a predicted probability of engagement for the customer associated with the retrieved unified customer data profile; and using a centralized campaign manager subsystem of the computer system:

obtaining a unified customer record from the database, wherein the unified customer record indicates the customer has not provided consent to receive a telephone call;

establishing a connection with the customer via one or more non-telephonic channels of communication;

obtaining customer consent via the one or more non-telephonic channels;

updating the consent status in the unified customer record and store the updated unified customer record in the database; and where consent has been obtained, using the predicted probability of engagement for the customer associated with the retrieved unified customer data profile to generate a call time and make, using an automated telephone dialing system, an outbound telephone call to the customer at the generated call time.

10. The method of claim 9, further comprising the steps of:
   using a propensity prediction and optimization subsystem:
      receiving a plurality of customer records;
      using one or more machine learning modules on the plurality of customer records to:
         predict the most probable block of time of each day each customer in the plurality of customer records will engage in communication;
         predict the most probable means of communication for each block of time for each customer in the plurality of customer records;
         predict the propensity to churn for each customer in the plurality of customer records; and
         predict the probability of each customer in the plurality of customer records to pay a bill;
      sending the predictions to the analytics subsystem, the predictions comprising the predicted propensity to churn, the predicted probability to pay, the most probable time of each day, and the predicted most probable means of communication.

11. The method of claim 9, wherein the one or more sources comprises enterprise-specific customer records, social media, web applications, and mobile device applications.

12. The method of claim 9, wherein the standard data format is a JSON format.

13. The method of claim 9, wherein the database comprises at least a relational database.

14. The method of claim 13, wherein the database further comprises a non-relational database.

15. The method of claim 9, wherein the predicted propensity to churn, the predicted probability to pay, the most probable time of each day, and the predicted most probable means of communication are all based at least in part on real-time status data.

16. The method of claim 9, further comprising the step of receiving a predicted effectiveness of sending a reminder to the customer associated with the retrieved unified customer data profile at a specific time relative to another specific time.

* * * * *